United States Patent [19]

Riley et al.

[11] Patent Number: 5,395,042
[45] Date of Patent: Mar. 7, 1995

[54] APPARATUS AND METHOD FOR AUTOMATIC CLIMATE CONTROL

[75] Inventors: Joseph D. Riley; Marc H. Popek, Las Vegas, Nev.

[73] Assignee: Smart Systems International, Las Vegas, Nev.

[21] Appl. No.: 197,615

[22] Filed: Feb. 17, 1994

[51] Int. Cl.$^6$ ............................................. F23N 5/20
[52] U.S. Cl. .................................... 236/46 R; 236/47; 165/12
[58] Field of Search ................. 165/12; 236/47, 46 R

[56] References Cited

U.S. PATENT DOCUMENTS

| | | | |
|---|---|---|---|
| Re. 33,146 | 1/1990 | Carrell et al. | 165/11.1 |
| 4,101,886 | 7/1978 | Grimes et al. | 165/14 |
| 4,294,404 | 10/1981 | Gajjar | 236/94 X |
| 4,433,809 | 2/1984 | Schulz | 236/47 |
| 4,655,279 | 4/1987 | Harmon, Jr. | 165/2 X |
| 4,706,882 | 11/1987 | Barnard | 236/46 R |
| 5,088,645 | 2/1992 | Bell | 236/46 R |
| 5,127,575 | 7/1992 | Beerbaum | |
| 5,165,465 | 11/1992 | Kenet | |
| 5,219,119 | 6/1993 | Kasper et al. | 165/12 X |

*Primary Examiner*—William E. Wayner
*Attorney, Agent, or Firm*—Flehr, Hohbach, Test, Albritton & Herbert

[57] ABSTRACT

An apparatus and method for controlling the operation of (HVAC) equipment or other climate control equipment. The method is executed by a conventional computer with a memory storing a program. The system determines whether the space is not occupied and if the temperature drifts outside an allowed margin, then the system allows the temperature to drift to a maximum allowable margin, or to a newly determined margin, whichever is less. The newly determined margin is based upon a determination of the maximum temperature margin to which the system can drift and still drive the temperature back substantially to the use set point within a predetermined maximum recovery time. The recovery time is calculated based upon past temperature-vs.-time data stored for previous cycles of drift and drive. The system can further increase the energy savings by augmenting the allowed recovery time and/or maximum drift range when the ratio of the incremental drift time to the consequent required drive time exceeds a predetermined, programmable amount, i.e. when the added drive time required to return to a certain temperature is small relative to the added allowed drift time for the space, during which the HVAC equipment is not operating and hence no energy is being consumed. Savings and usage of energy over time are stored, and are output to the user upon request to the control computer. The stored data can also be used to determine whether the HVAC equipment's efficiency is deteriorating, and thus whether corrective maintenance is needed.

47 Claims, 9 Drawing Sheets

Figure 6 – *Multisensor System*
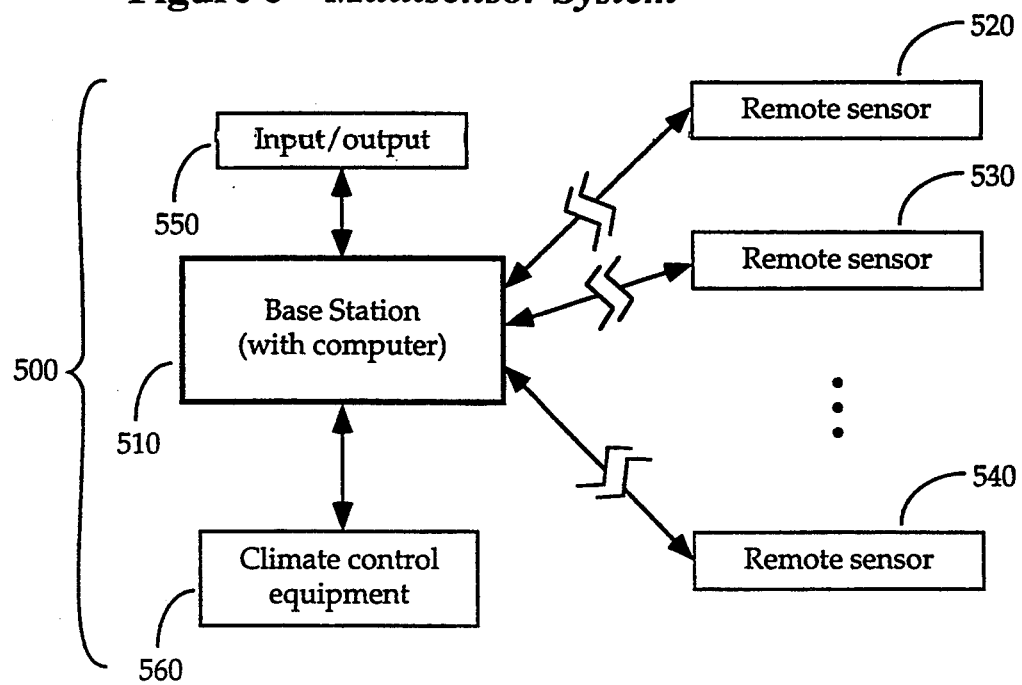
Figure 7
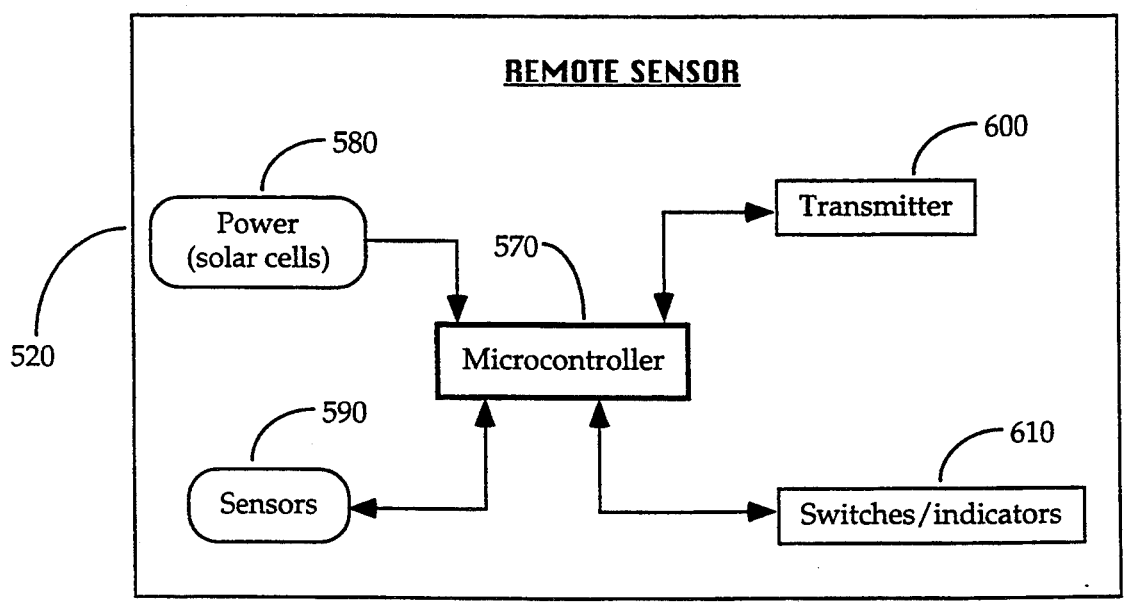

APPARATUS AND METHOD FOR AUTOMATIC CLIMATE CONTROL

This invention relates to the temperature and other climate control of interiors of buildings, and in particular to a system for controlling the temperature of an environment according to predetermined criteria including the presence or absence of people, programmable comfort ranges, and programmable time tolerances to reach those comfort ranges.

BACKGROUND OF THE INVENTION

In conventional temperature or climate control systems (e.g. heating, ventilating and air conditioning systems, referred to herein generally as "HVAC"), thermostats are used to control when the HVAC system turns on and off. The user presets a desired temperature (or "user set point"), and when the temperature of the controlled space is different from the preset temperature, the HVAC system heats or cools the air until the preset temperature is reached.

Thus, conventional enclosed space thermostats are merely on/off switches with a sensor to measure the enclosed space temperature and means for users to set their preferred temperatures. A problem with such thermostats is that the temperature is maintained at the user set point whether people are present or not, using costly natural resources. Heating or cooling when people are not present wastes a great deal of these resources.

Some enclosed space thermostats come with a built-in clock and have a method for people to program different user set points for different times and days. Such clock-thermostats provide different HVAC service when people are expected to be present than when they are expected to be absent. Problems with this approach are that the programming of the clock-thermostats is troublesome, and moreover that, even when the programming is done correctly, people's schedules change and thus often do not match the preprogrammed times.

Some enclosed space thermostats come with sensors to detect people. They switch from one conventional thermostat when people are present to a second conventional thermostat when people are absent. The second thermostat may have a second fixed temperature, in order that it may shift ("setback" or "setup") a fixed number of degrees from the first temperature when people are absent. The problem with these thermostats is the second temperature is often either too far away from the first temperature to provide satisfactory comfort when someone returns to the room, or too close to the first temperature to achieve adequate energy savings. Further, enclosed space and ambient conditions change constantly, so these thermostats are very difficult to regulate for optimal energy savings versus comfort trade-offs. Even if a user could figure out the optimum second thermostat setting for comfort and maximum energy savings at a given time, conditions constantly change and that setting may quickly become non-optimal. (In general, the term "ambient"—as in "ambient temperature"—will be used to refer to the temperature or other conditions of the region surrounding the controlled, usually enclosed, room or other space. "Space temperatures" will be used to refer to temperatures within the controlled space.)

There is thus a need for a climate control system that takes into account the occupancy status of a controlled space and automatically responds to variations in space and ambient conditions so as to minimize energy usage while meeting predetermined comfort, health and other criteria that may be preset by the user. Such a system should preferably take into account variable comfort settings for different people, both as to temperature and as to the time allowed for the temperature to recover to the preferred setting when people return from an absence (referred to herein as "recovery time"). The system should also automatically accommodate variable enclosed space conditions, including variable thermal energy leakage to and from the enclosed space, and variable thermal energy sinks (furniture, equipment, wall and floor coverings, etc.) in the enclosed space. Moreover, variable ambient conditions should be accommodated (such as day or night, summer or winter, clear or rainy, calm or windy), and additionally the system should compensate for variations in HVAC equipment operating capabilities. All of these goals are met automatically by the system of the present invention.

Conventional systems do not take into account the nonlinear relationships between HVAC equipment operation and the responses (temperature, humidity, etc.) of the controlled space with time. There is a need for a system that recognizes and utilizes such nonlinear relationships to effect climate control, such as by using exponential curve fitting.

SUMMARY OF THE INVENTION

The system of the invention uses one or more remote sensors and base stations. The remote sensor is a device that detects the transient or permanent presence or absence of people, and transmits these "occupancy status" observations to the base station. The remote sensors have temperature sensors to report the temperature to the base station, and the base station may have additional temperature sensors. Both the base station and the remote sensors are controlled by means of microcontrollers with control programs stored in memory to implement the functions of the invention and to control the heating/ventilating/air-conditioning (HVAC) equipment to maintain the space temperature at a user set point, with a broad range of variations as described below. The base station controls the HVAC equipment based upon the history of the actual operation and response of the system in the controlled space.

When people return from an absence, they want the temperature to be at, or within a range of, their preferred setting within a time they decide is acceptable. The base station is thus an adaptive, learning machine that controls the HVAC equipment to implement the users' temperature and time preferences. The base station provides for adjusting a user set point, i.e. a desired temperature set by the user. It also provides for the setting of:

(A) a specified maximum temperature range that the temperature may drift away from the user set point;

(B) a specified maximum recovery time for the temperature to return to a margin around the user set point (this maximum recovery time may be zero, to always keep the temperature at the user set point; or it may alternatively be a very long period ("infinity"), to substantially always revert to the fixed maximum temperature setback); and (C) a specified minimum temperature range (which may be substantially zero) around the user set point for the system to return the temperature to, within the specified recovery time.

The base station receives occupancy status transmissions from its associated remote sensor(s). It measures, computes, and learns temperature-versus-time nonlinear relationships when the HVAC equipment is on ("drive"), and the corresponding but different relationships when the HVAC equipment is off ("drift"). Once the drift and drive curves (i.e. drift and drive vs. time relationships) are learned, the system uses this information for future control decisions, including how far to allow the temperature to drift past a preset range before activating the HVAC equipment. In general, the temperature will be allowed to drift further when the space is not occupied than when it is.

The base station controls the HVAC equipment, always collecting and recording temperature-vs.-time data about the enclosed space and using this data to continuously maximize energy savings by running the HVAC equipment at minimal levels when the space is not occupied, while being prepared to return the temperature to the user set point or to the minimum temperature range around the user set point within the specified recovery time.

The system of the invention can augment the allowed drift time when certain internal criteria are satisfied, such that users won't notice the incremental increase in time to return to the programmed temperature. This leads to additional savings of energy.

Energy savings and amount of equipment usage can be derived from the data stored by the system. Other variations are programmable into the control parameters, such as expanding the allowed temperature range when a controlled space is unoccupied for a long period of time, yielding further energy savings.

BRIEF DESCRIPTION OF THE DRAWINGS

FIG. 6 is a block diagram showing a base station of the invention in use with multiple remote sensors.

FIG. 7 is a block diagram of a remote sensor for use with the invention.

DESCRIPTION OF THE PREFERRED EMBODIMENTS

The present invention is directed to a system for controlling levels of a predetermined environmental attribute of a room or enclosed space by operating an environmental control unit or equipment in response to changes in such attribute levels, so as to keep the current level of the attribute in the room within a certain range of a user set point, i.e. a user-determined desired level for the attribute. A preferred embodiment of the invention involves the controlled operation of heating, ventilating and air conditioning (HVAC) equipment. The use of the present invention leads to considerable energy savings over existing systems.

Figure 1:
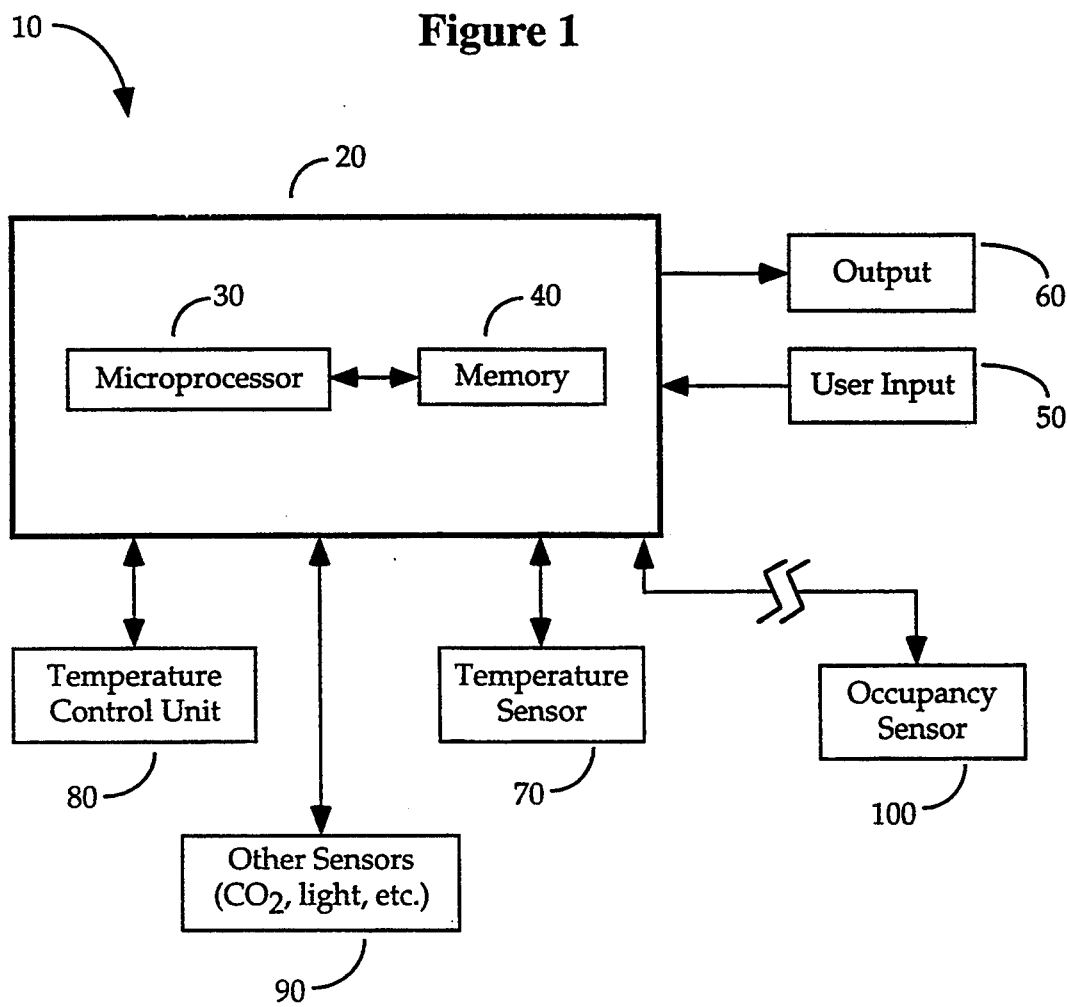
FIG. 1 is a block diagram of a system implementing the present invention.

The invention is preferably implemented in a computer system 10 for controlling the equipment, as in FIG. 1, which shows a conventional multipurpose or dedicated computer base station 20 including a microprocessor 30 coupled to a memory 40. Input is provided via a user input device 50 coupled to the computer 20; the device 50 may include a keyboard, microphone for voice control, infrared or radio remote devices, touch screens, or any one of many other conventional input devices for computers, including input ports for communications from other computers or electronic devices. Output is provided through output device(s) 60, which may include any one or more standard output devices such as a monitor, a printer, audio devices, communications ports for other computers, or other devices that can receive and utilize computer outputs.

One or more environmental attribute sensors such as temperature sensors 70 are provided, and are directly coupled to an input to the computer 20 or communicate with the computer via a conventional remote means, such as infrared, radio or building wiring. Other sensors 90 are similarly coupled to or otherwise communicate with the computer 20, as well as one or more occupancy sensors 100 for detecting the presence of people in a given space whose climate is to be controlled.

The occupancy sensor(s) 100 may be a conventional personnel detector (such as a commercially available infrared detector) and preferably communicates with the computer 20 via a remote link, such as by infrared or radio transmission or transmission over building wiring.

The system described below and each of its variations are controlled by the computer 10 in response to instructions in an environmental control program stored in the memory 40. Wherever a controller or processor is mentioned, it should be taken as meaning a conventional or dedicated processor such as processor 30, which in each case will have an associated memory for storing both the control program and the data that are generated and sensed or otherwise input during the course of operating the system.

Figure 1A:
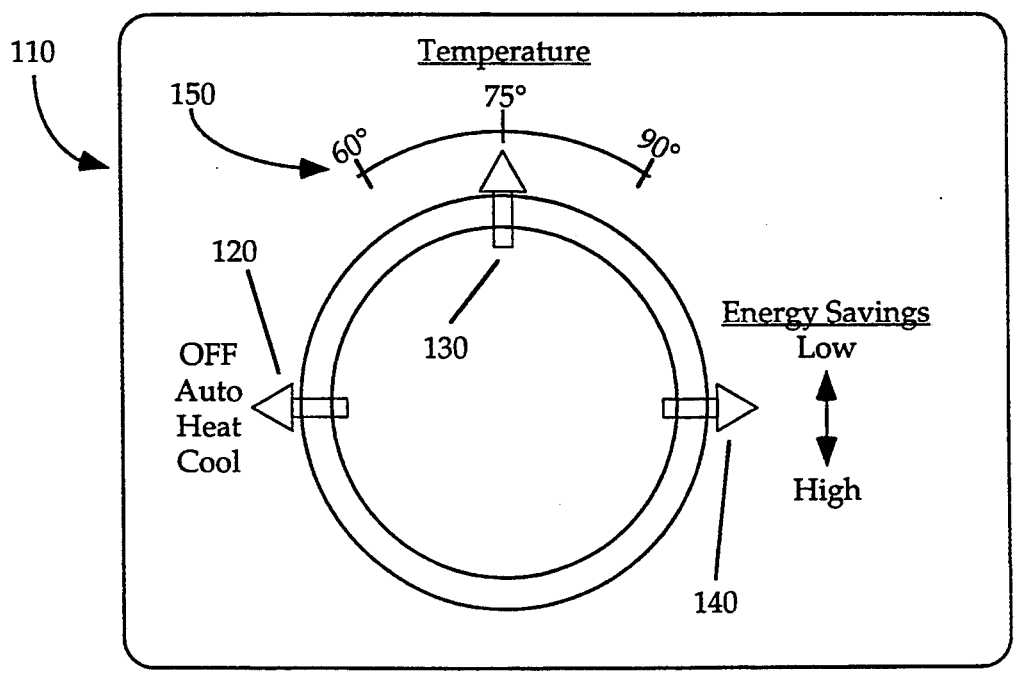
FIG. 1A shows a user interface control for use with the system of FIG. 1.
Figure 2:
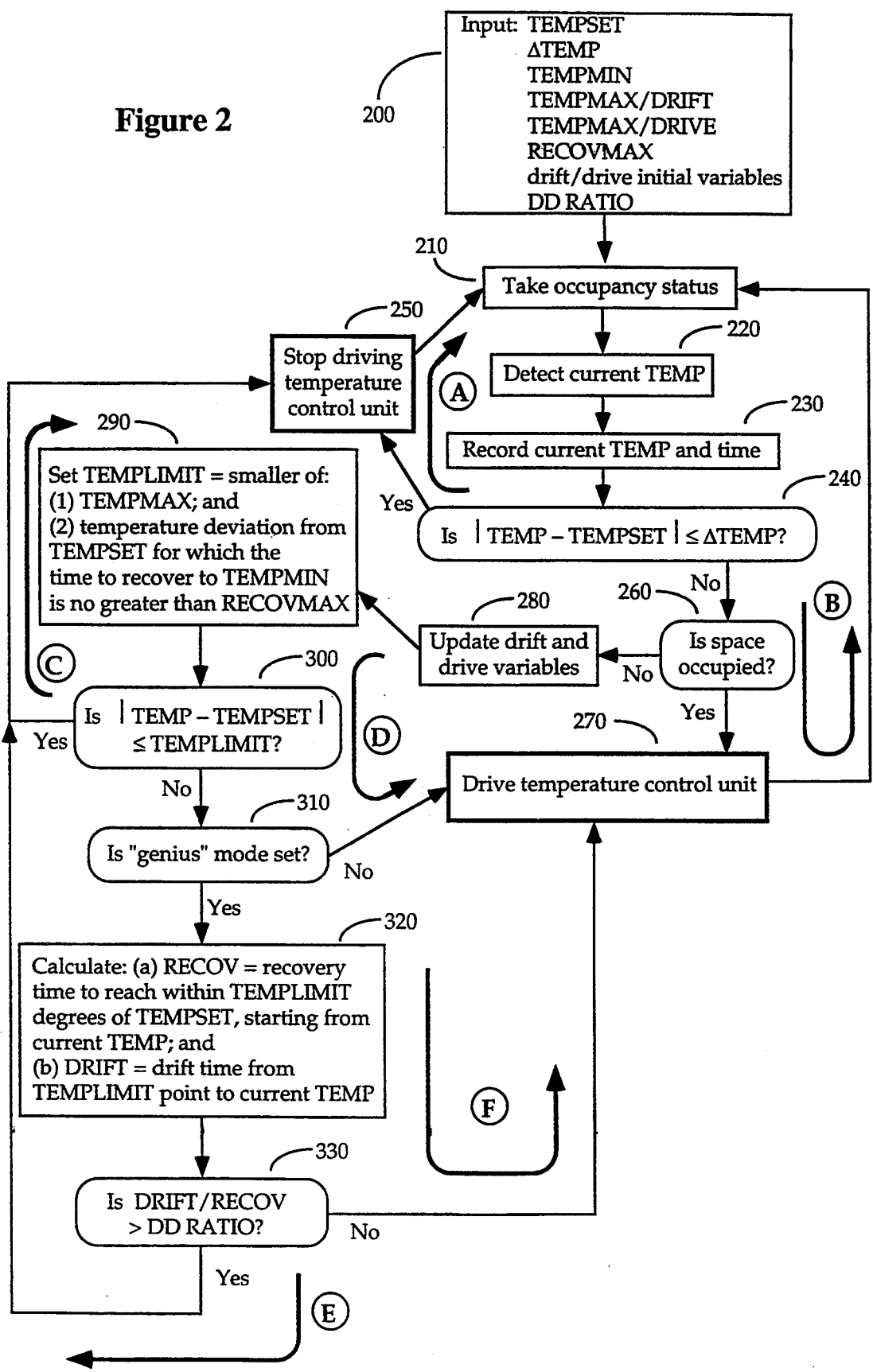
FIG. 2 is a flow chart illustrating a preferred embodiment of the method of the invention.

FIG. 1A shows an appropriate control unit 110 to act as a user interface for the system, to be used as described after the discussion of FIG. 2.

Specific embodiments of sensors and base stations which may be used to implement features of the invention are discussed below in connection with FIGS. 6-11.

FIG. 2 is a flow chart illustrating the operation of the system of the invention, which will first be described in its basic form, followed by a description of numerous variations on the fundamental embodiment. The method is based upon the fact that the temperature response of a given space to climate control equipment, and to ambient temperatures different from the space temperature, is very difficult to predict. Thus, the present invention uses an empirical approach to climate control, which will first be described in general terms, followed by a detailed description of the method as illustrated in the flow chart of FIG. 2.

Drift and drive temperature response of a space

Figure 3:
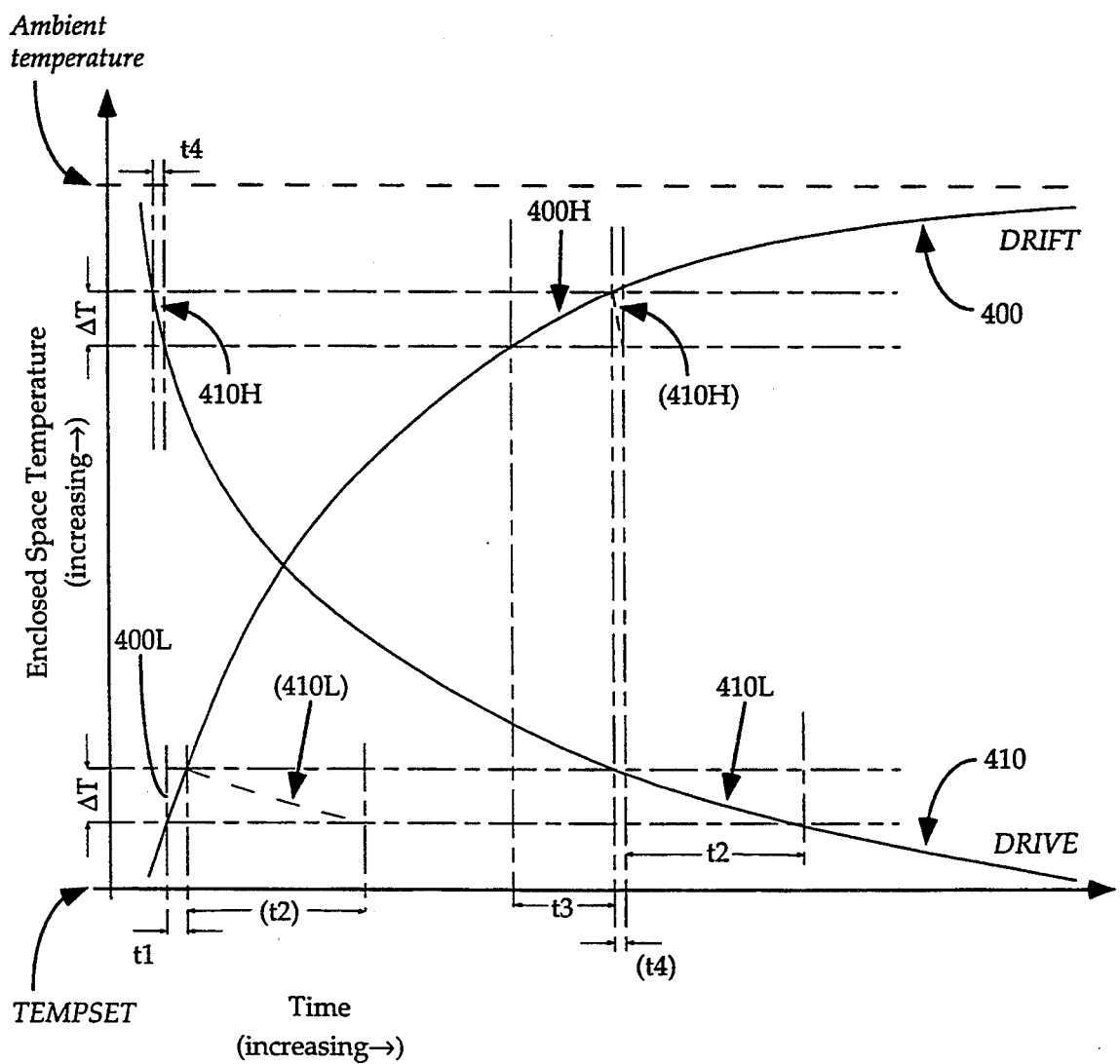
FIG. 3 is a graph depicting the drift and drive temperature responses of a space.

FIG. 3 shows the nature of the response of a room or other space to temperature control and to ambient temperatures different from the temperature within the space. The graph of FIG. 3 illustrates the temperature response of such a room where the ambient temperature is in general higher than the temperature within the room, such as would be the case for an airconditioned room on a hot day. For a heated room on a cold day, the principles are the same, but the direction of increasing temperature on the y-axis would be inverted.

Curve 400 in FIG. 3 shows the exponential temperature response of the space over time, beginning at a low temperature TEMPSET (which would be a temperature at which an air conditioner thermostat is set, for instance) and approaching the ambient temperature (e.g. the outside temperature on a hot day) as time passes. Curve 410 is a similarly exponential curve showing the response of the space to the air conditioner being driven from ambient down toward TEMPSET.

The ambient temperature is generally the temperature that the unoccupied, enclosed space will drift to when the HVAC equipment is off; i.e., if the temperature is higher outside than inside, the temperature of a room will tend to drift towards the hotter outside temperature. (In some cases, the temperature inside may get hotter than the temperature outside, in which case it will not always be true that the space temperature approaches the outside ambient temperature; this does not affect the present system, which in either case will work to cool the space down towards TEMPSET. What is true in both cases is that the enclosed space drifts towards some equilibrium temperature, which usually will be substantially the same as the ambient temperature of the region surrounding the enclosed space. For the examples in the present application, "ambient" temperature may be taken to mean equilibrium temperature for the space.)

The unoccupied, enclosed space temperature thus generally drifts toward the ambient at a decreasing rate and may be driven from the ambient at a decreasing rate. These variable rates "deceleration curves") are very closely described by exponential equations of the form $T = C + Ae^{-t/B}$, where T=temperature, t=time, and A, B, and C are known or learned parameters, discussed below. The drift and drive equations have the same form, with different values for the parameters. By measuring changes in temperature and time, these equations can be solved (i.e., all six parameters are "learned").

Once solved, the time to drive the temperature from one point to another, or the time it takes for the temperature to drift from one point to another, can be computed. As the ambient temperature changes, the A and C parameters of the drift and drive equations are recalculated. Recovery times under continuously varying conditions can then be computed, which enables the system to continuously adjust and maximize the drift boundary temperature, thus minimizing HVAC equipment use while always being ready and able to drive the temperature back to, or within a range of, the user set point in the specified recovery time. Specific implementations of these functions are discussed below.

The above equations give accurate, empirically determined predictions for drift and drive with only temperature and time measurements. Additional variables, such as humidity, may be added to the system, for which more complex nonlinear equations would be used to accurately characterize the "comfort" relationships that must be learned for accurate control.

Figure 4:
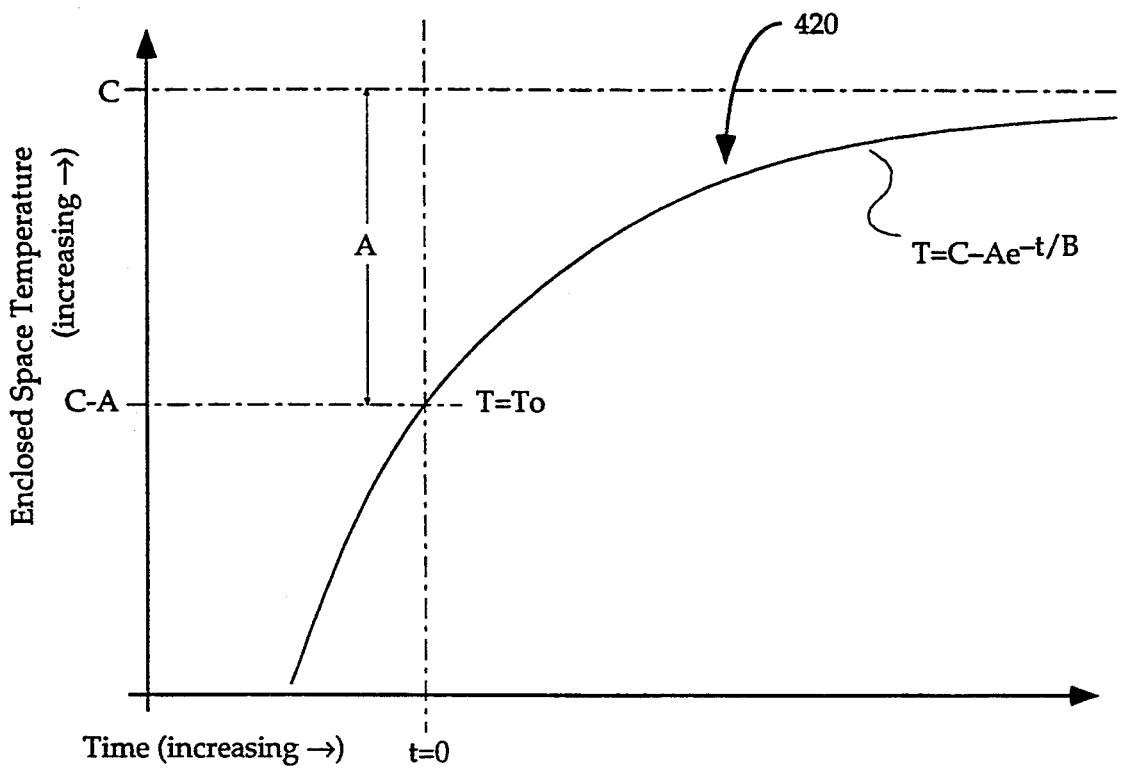
FIG. 4 is a graph depicting the drift temperature response of a space, identifying parameters to an exponential equation representing the response.

FIG. 4 shows a curve 420 similar to curve 400 of FIG. 3, and graphically illustrates the parameters A, B and C mentioned above. These parameters are defined as follows (for the drift situation):

A: the temperature deviation of the controlled space at time t=0;

B: the exponential time constant (or "Tau constant") of the equation; and

C: the temperature to which the controlled space will drift over time (i.e. the equilibrium temperature of the space with the HVAC equipment shut off).

Figure 5:
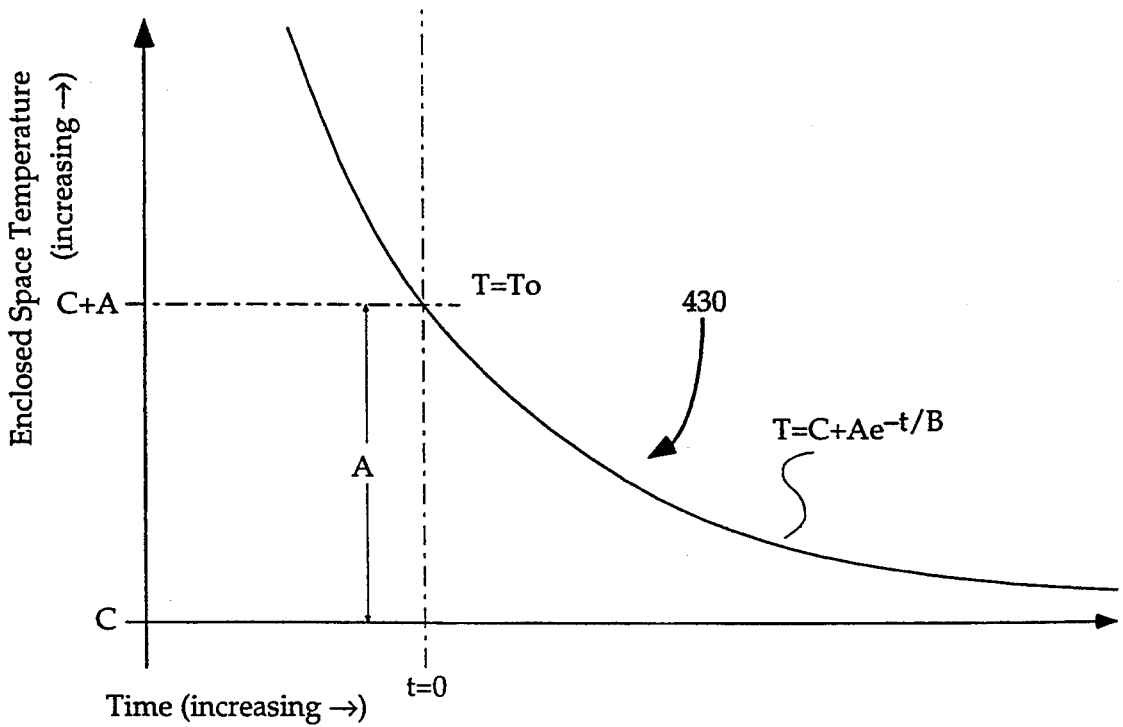
FIG. 5 is a graph depicting the drive temperature response of a space, identifying parameters to an exponential equation representing the response.

FIG. 5 shows a curve 430 similar to the curve 410 of FIG. 3, and is the drive counterpart to the drift curve of FIG. 4. The parameters in FIG. 5 are defined in a similar manner to the parameters of FIG. 4, with C being the temperature that the space would asymptotically approach if the HVAC equipment were driven for a very long time under the same conditions (ambient temperature, HVAC power setting, etc.).

The A parameter may be regarded as the distance the temperature would have to travel to reach C from where it is at time zero.

The B parameter (the Tau or time constant) is the time it would take the temperature to travel 63% (1−1/e) of the distance toward C from where it starts at time zero. The proportion of the distance traveled toward C can be calculated as "n" Tau's (= 1−(1/e)n).

The C parameter is, as noted above, the temperature (in both the drift and drive equations) to which the space is headed. In the drift equation, it is the extreme (maximum or minimum, depending upon whether ambient is hotter or colder) temperature the enclosed space will reach if left alone long enough with a constant ambient temperature (i.e., the enclosed space equilibrium temperature without HVAC equipment running). In the drive equation, it is the extreme (again, minimum or maximum, counterposed to the extreme in the drift situation) temperature that the HVAC equipment can drive to with a constant ambient temperature (i.e., the enclosed space equilibrium temperature with the HVAC equipment running).

The rate at which an enclosed space temperature changes with time decreases as it drifts closer to the ambient. The rate at which an enclosed space temperature changes with time decreases as it is driven farther away from the ambient. These phenomena are shown by the curves plotted in FIG. 3. Curve 400 illustrates that more time is needed to drive a specified distance (ΔT) away from the ambient temperature at a lower temperature (see segment 410L) than at a higher temperature (see segment 410H), i.e., t2>t4.

Curve 400 for its part illustrates that it takes less time for the temperature to drift toward the ambient temperature a specified distance (ΔT) when it is farther away from the ambient temperature (see segment 400L) than when it is closer (see segment 400H), i.e., t1<t3.

Curves 400 and 410 further demonstrate, by a comparison of the segments 400H, 400L, 410H and 410L (see the segments (410H) and (410L), repositioned for comparison with 400H and 400L, respectively) that the proportion of time spent driving when holding (i.e., cycling repeatedly through both drift and drive to maintain) an enclosed space temperature within a specified range (ΔT) is greater when the temperature is farther from the ambient temperature than when it is nearer. Mathematically, this is expressed as: $t_2/(t_1+t_2) > t_4/(t_3+t_4)$.

The current system records in the computer memory a series of measurements of temperature vs. time when (1) the enclosed space is drifting, and (2) when it is being driven by HVAC equipment. These measurements are used to solve the drift and drive equations, where Temperature $= C + A * e^{-time/B}$. Each equation can be solved precisely, with three pairs of measurements, provided the time intervals between measurements are equal; this is discussed in detail below.

As the ambient temperature changes, the A and C parameters of the drift and drive equations must be adjusted. Once the B parameters are learned for an unoccupied space, they remain constant until the space is reoccupied and vacated. In the drift equation, the initial temperature $T_0 = C + A$, so changes in C are linearly coupled to changes in A; i.e., $A = T_0 - C$.

Deriving the drift and drive parameters

The curves and parameters shown in FIGS. 3-5 provide description of the behavior of a space in response to temperature control. The equation is of the form $T = C + A * e^{-t/B}$. It will be assumed for this example that it is a hot day and the HVAC equipment is being used to drive the temperature downward, though because of the symmetry of the mathematics the example will work equally well for a cold ambient temperature where the space is instead being heated.

The sensors measure temperature, the system of the invention measures the temperature and elapsed time as pairs of data points (in a manner to be described below in connection with FIG. 2). In this example, time periods of measurement are selected that are equal, i.e. three points are selected that are evenly spaced in time, as follows:

| time (seconds) | Temperature (°F.) |
|---|---|
| $t_0$ (or t0) = 0 | $T_0$ = 80.00 |
| $t_1$ (or t1) = 180 | $T_1$ = 74.59 |
| $t_2$ (or t2) = 360 | $T_2$ = 71.61 |

The A, B, and C parameters have closed form solutions, assuming $(t_1 - t_0) = (t_2 - t_1)$, as follows:

$$B = -(t_1 - t_0)/ln\{(T_2 - T_1)/(T_1 - T_0)\}$$

$$A = (T_1 - T_2)/(e^{-t1/B} - e^{-t2/B})$$

$$C = T_1 - A * e^{-t1/B}$$

Computing the parameters, the drive equation becomes:

$$T = 68 + 12 * e^{-t/300},$$

which means that the drive Tau is 300 seconds; i.e., about $1 - (1/e)^{300/300} = 63\%$ of the temperature differential that can ultimately be driven is reached 300 seconds after driving (here, cooling) is begun, and the total drive distance will ultimately be 12° downward from 80 degrees (=68+12).

In this example, the lowest temperature to which the system can practically be driven is 68° F., this being the value that T asymptotically approaches as t (time) goes to very large numbers (i.e. $e^{-t/300}$ approaches zero, and thus t approaches "infinity"). This will be the case where, for instance, the HVAC equipment is not very powerful, or there is a leak in the space so that cool air is being lost, or where the temperature of the air blown by an air conditioner is, in fact, 68°. In other words, the system of the invention automatically determines the practical limitations of the physical space and the climate control equipment in an empirical manner.

These drift and drive parameters will be used in the method of the invention as shown in the flow chart of FIG. 2.

The method of FIG. 2

A conventional approach to climate control is to take the user set point as a target temperature, and whenever the temperature in the controlled space drifts away from this set point, to drive HVAC equipment until the temperature within the space returns to the set point, or within a practical margin ($\Delta$TEMP) from the set point. A variation on this is to include an occupancy detector such as sensor 100, and when no one is present to allow for a greater deviation from the set point, but to drive the temperature back to the set point $\pm \Delta$TEMP when someone returns.

The first of these approaches is accommodated by the method illustrated in flow chart of FIG. 2 by the loop labeled as loop A through boxes 200-250 (and back through box 210). The user inputs the set point TEMPSET, and the margin. $\Delta$TEMP may be input at this time or may be preprogrammed. Indeed, any of the input variables discussed below (such as those listed in box 200) may be preprogrammed, and specified by the manager/owner of the system to be changeable by the user or not, as desired. The variables input at box 200 have the following dimensions and definitions:

TEMPSET: (temperature): the user-defined set point;

$\Delta$TEMP: (temperature): the margin around TEMPSET (or TEMPLIMIT) within which the temperature is actually held;

TEMPMIN: (temperature): an optionally set margin around TEMPSET, used in conjunction with RECOVMAX to determine TEMPLIMIT, as discussed below;

TEMPMAX: (temperature): a user-specified margin around TEMPSET at which the space temperature is preferably maintained when the space is unoccupied;

RECOVMAX: (time): a user-specified time representing the maximum time period that the system should take to return the space to TEMPSET ($\pm \Delta$TEMP or TEMPMIN) when a person first occupies the space after it has been unoccupied;

drift/drive initial variables: A, B and C in the drift/drive equations. A and C are temperatures, and B is in units of time; and DD RATIO: (dimensionless): This variable represents an energy-saving ratio, specified by the user or the system manager, of drift time to drive time outside the range of TEMPMAX in the "genius" mode, discussed below.

The initial values of the drift and drive parameters may be input by the system manager or user if enough is known about the system to make a good guess at the values. They will in any case be automatically adjusted as the system collects empirical information as the space is heated and/or cooled, and it is preferable to generate accurate drift and drive data as described in the above section entitled "Deriving the drift and drive parameters". The system would in this case by cycled through at startup time to gather the necessary data, and then it would be ready to accurately execute the required control of the HVAC equipment pursuant to the method of FIG. 2.

Once all input data is collected and stored by the system, the occupancy status (i.e. the presence or absence of someone in the controlled room or space) is detected at box 210, and the temperature TEMP of the space is detected at box 220. These are stored in the memory, as are all of the variables and input data during the execution of the method. At box 230, the current TEMP and the time are stored together, i.e. correlated, which will be used later in calculating drift and drive curves for the room or other space being controlled.

At box 240, it is determined whether the current space temperature TEMP is within the predetermined margin ΔTEMP from the set point TEMPSET. For example, the user may have input 72° as a comfortable temperature, and ΔTEMP may be 0.5°. If the temperature in the space is within the range 71.5° to 72.5°, then the determination at box 240 is positive, so the method branches to box 250. If the system has been driving the HVAC equipment, this ceases at this point; if the system was not already driving the HVAC equipment, then it remains off at box 250. Then the method branches to box 210 and loop A begins anew. Note that in loop A (boxes 210–250 of FIG. 2), the occupancy status is not relevant, since the temperature is substantially at the set point, and the HVAC equipment will not be driven in any case.

Loop B represents the situation where the space is occupied and the space temperature drifts outside the desired range (TEMP±ΔTEMP); namely, at box 260 it is determined that someone is present, and thus the step at box 270 causes the computer to turn on the HVAC equipment, for which the program is provided with commands for controlling the equipment in a conventional manner. Thus, whenever TEMP drifts up (on a hot day) above 72.5°, in this example, or (on a cold day) below 71.5°, the HVAC equipment will be activated to drive the temperature back to within 0.5° of the set point, 72° (e.g. down to 71.5° or up to 72.5°, respectively). Alternatively, the system may be configured such that whenever on a hot day the temperature drifts above 73°, when the set point is 72° and ΔTEMP is 1°, the HVAC equipment drives the temperature down to 72°. Similar variations are used without substantive departure from the principle of keeping the temperature within some margin ΔTEMP of a set point.

Loop B returns to box 210, and the method begins anew at that point. If the temperature has returned to (TEMP±ΔTEMP), then loop A is executed, and the HVAC equipment is turned off; otherwise, loop B is executed again, and at box 270 the (already operating) HVAC equipment continues to run.

It may be, however, that before the preset range around the set point is reached (i.e. before the range of temperatures TEMP±ΔTEMP is reached), everyone who has been in the controlled space leaves. Alternatively, it may be that the temperature of an unoccupied space drifts outside the preset range. In either case, the decision at box 260 branches to box 280, where variables in the drift and drive equations (as in FIGS. 3–5) are updated.

Steps 280–290: Calculations of drift and drive variables and TEMPLIMIT

At step 290, the variable TEMPLIMIT is set to the smaller of (1) TEMPMAX and (2) the temperature deviation from TEMPSET for which the time to recover to TEMPSET (or optionally, TEMPMIN) is no greater than RECOVMAX.

The value for TEMPMIN is selected as some temperature range around TEMPSET such that a person in the controlled space will be comfortable even though the temperature may be outside the range TEMP±ΔTEMP. For example, if TEMP is 70° and ΔTEMP is 0.5°, normally the system would maintain the temperature at 69.5° to 70.5°. However, with the use of the variable TEMPMIN the operator has the option of specifying a temperature range near 70°, such as ±2°, such that it will be acceptable if the system reaches this slightly broadened range within a given period of time RECOVMAX, e.g. six minutes. It may then take additional minutes to reach the ideal of 70.5°±0.5°, but the persons in the room will probably not notice the difference, once the 2° TEMPMIN margin is reached. Note that TEMPMIN may be set to be zero or the same as ΔTEMP, if desired, thus bypassing the "comfort range" option. In this case, the calculation under step 290, item (2) is carried out with TEMPSET as the target temperature.

The temperature deviation under step 290, item (2) is derived from the value of RECOVMAX in the following manner: if the HVAC system drives the temperature down to, for example, 70 degrees and shuts off (i.e. the user set point is 70 degrees, ignoring ΔTEMP for the moment), then—using the exemplary drive equation discussed above—one can see that 70 degrees is reached after 537.53 seconds (almost nine minutes). If RECOVMAX is set, for instance, to six minutes, or 420 seconds, the system must determine how far the system can allow the temperature to drift and still be able to drive back to 70 degrees in 420 seconds. Using the foregoing exemplary equation, $T_{max}$ would be calculated as follows:

$$T_{max} = 68 + 12 * e^{-(537.53 - 420)/300} = 76.11$$

Thus, the temperature can be allowed to drift to 76.11 degrees and the system can still drive back to 70 degrees in 420 seconds.

The foregoing calculation is performed in the same manner when ΔTEMP or TEMPMIN is taken into account; the only difference is that the latter variables are taken into account when calculating the time it will take to drive to the target temperature. Thus, if TEMPMIN=2°, then the time it would take to drive to 72° would be compared with RECOVMAX to generate the value for $T_{max}$, and this value would be larger than 76.11° since the system would not need to drive all the way back to TEMPSET.

Essentially the same procedure as for the drive equation parameters is used to find the drift equation A, B, and C parameters, which are different from the drive equation parameters and yield a different equation of the same form. For instance, for a user set point of 70° and a maximum drift to 90°, the drift equation describing the behavior of the temperature when the equipment is turned off may be:

$$T = 90 - 20 * e^{-t/720},$$

which means the drift Tau is 720 seconds, and that when the HVAC equipment is turned off, the farthest the temperature will drift is up to 90°. (Note that at t=0, the temperature is 70°.) The slope of the drift equation at T=76.11° is given by:

$$dT/dt = -A/B * e^{-t/B},$$

so, observing that $T = 76.11 \rightarrow t = 262.49$:

$$dT/dt = -(-20)/720 * e^{-262.49/720} = 0.01929 \text{ degrees/sec.}$$

In the drift mode, B varies so little it may be taken as constant. At the drift temperature boundary in this example, with $B = 720$ and $t = 262.49$, only A will vary significantly as the ambient temperature forces the enclosed space leakage rate (i.e., the slope) to change. As it gets hotter outside, dT/dt will increase at the drift temperature boundary. To hold the temperature at 76.11, the system repeatedly allows the temperature to drift a little (such as 0.5°) above 76.11, and then drives it back a little (again, such as 0.5°) below 76.11. (Alternatively, the temperature could be allowed to drift to 76.11, and then be driven, for instance, one degree below that.)

If the temperature is allowed to drift 0.5° above 76.11 and is then driven 0.5° below 76.11, for a 1 degree total drift, then initially the time for this 1° drift is $(dT/dt)_0 = 1/0.01929 = 52$ seconds. As it gets hotter outside, the time for the 1° drift is measured. If it is, for instance, 35 seconds, then $(dT/dt)_1 = 1/35 = 0.02894$. Since $dT/dt = -A/720 * e^{-262.49/720} = -A *$ constant, so that:

$$(dT/dt)_1/(dT/dt)_0 = -A_1/-A_0 \text{ and}$$
$$A_1 = A_0 * (dT/dt)_1/(dT/dt)_0,$$

and therefore $$A_1 = -20 * 0.02894/0.01929 = -30.$$

Note that, from the drift equation at $t = 0$:

$$T = C + A * e^{-0/B} = C + A,$$

so that $$T_0 = 90 + (-20) = 70 = C + A$$

and $$C_1 = T_0 - A_1 = 70 - (-30) = 100,$$

and the new drift equation is:

$$T = 100 - 30 * e^{-t/720}.$$

This means the drift Tau is still 720 seconds, and that when the HVAC equipment is turned off now, the farthest the temperature may drift to is 100°, i.e., $C_{drift} = 100$.

When $C_{drift}$ changes, new drive equation parameters must be calculated at step 280. In the drive equation, $C_{drive}$ has a nonlinear relationship to $C_{drift}$, while A and B vary so little they can be taken as constant. $C_{drive}$ can be accurately estimated using a Gaussian equation of the form $$C_{drive} = C_{drift} + D * \exp[-((C_{drift} - E)/F)^2].$$

In this equation, D is the amplitude of $(C_{drive} - C_{drift})_{max}$, E is the temperature at $(C_{drive} - C_{drift})_{max}$, and F is one temperature Tau of the Gaussian equation, which is the approximate $\Delta C_{drift}$ needed to obtain a precise equation.

Three sets of D, E, F, $C_{drive}$ and $C_{drift}$ measurements are required to solve this equation precisely. After three drift and drive cycles of about one Tau duration at different ambient temperatures, all nine parameters can be precisely calculated, and the unoccupied space fully characterized by two exponential, one Gaussian, and one linear equation. Subsequent changes in the ambient temperature, measured on the drift side of the holding cycle, are used to compute new parameters and their associated drift and drive equations.

In practice, applicant has observed that $\Delta C_{drive} \approx 0.2 * \Delta C_{drift}$ for small changes in $C_{drift}$, and this estimate can be used until $(C_{newdrift} - C_{drift})/C_{drift}$ becomes greater than a fixed ratio set by the user or preprogrammer.

In summary, first the system learns the parameters for the following equations:

$$T_{drive} = C_{drive} + A_{drive} * e^{-t/Bdrive}$$

and $$T_{drift} = C_{drift} + A_{drift} * e^{-t/Bdrift}$$

As the duty cycle changes while holding the temperature at the current $T_{max}$, the system computes $C_{newdrift}$. Using $C_{newdrift}$, the system then computes $$A_{newdrift} = T_{drift\ 0} - C_{newdrift}$$

$$A_{newdrive} = A_{drive}$$

$$C_{newdrive} = C_{drive} + 0.2 * (C_{newdrift} - C_{drift})$$

and $$T_{newdrive} = C_{newdrive} + A_{drive} * e^{-t/Bdrive}$$

$$T_{newdrift} = C_{newdrift} + A_{newdrift} * e^{-t/Bdrift}$$

The concept of "duty cycle" is standard, and in this case may be defined as the percentage of the total time that the system is on to maintain the temperature at a given setting (such as $TEMPSET \pm \Delta TEMP$); i.e. the quantity (time on) divided by (time on + time off) to maintain such a temperature.

When $(C_{newdrift} - C_{drift})/C_{drift}$ is greater than a fixed ratio (such as 0.15), the HVAC equipment is run for a Tau duration to learn new drift and drive parameters, saving the first set of parameters. Then the simple linear adjustments are used until the fixed ratio is exceeded a second time, upon which the HVAC equipment is again run to learn new drift and drive parameters. At this stage, the system calculates the Gaussian parameters, and makes all further adjustments to the drift and drive equations using only duty cycle time changes relating to $C_{newdrift}$.

Variation on the exponential equation.

The form of the above equation, $T = C + A * e^{-t/B}$, may equivalently be taken as $T = C + A * e^{-Bt}$, with merely a change in dimension definition for B. The former is used in the present examples so that Tau has the dimension of time rather than inverse time, which makes it easier to conceptualize.

Once the parameters A, B and C in the equation $T = C + A * e^{-t/B}$ are determined, it is a straightforward matter to calculate any of the necessary values in the flow chart of FIG. 2.

The value for item (2) in step 290 can be determined in the above manner for any values of TEMPSET and RECOVMAX. Once TEMPLIMIT is set in this step, at step 300 it is determined whether the current temperature TEMP is within the allowed margin TEMPLIMIT from TEMPSET. If it is, then there is nothing to be done at this point, so the method proceeds to step 250, where the HVAC equipment is turned off (or, if it is already off, it remains off). The method then returns to step 210, which completes a pass of loop C. Loop C will be repeated, and no driving of the equipment will take place, as long as the controlled space remains unoccupied and the temperature in the space stays within the margin TEMPLIMIT (as determined in step 290) of the user set point.

Step 320: Loop E and the "genius" mode

If the temperature in the space drifts outside this margin, then the method proceeds to step 310, where it is determined whether the "genius" mode is set. This is a mode used by the invention to lead to greater energy savings, and can be indicating in the program in memory by a flag or other conventional means for indicating mode switching. The user control of the "genius" mode may be a hardware switch whose position is detected and communicated to the control program, or it may be a software control, which will be equivalent.

The genius mode is used to determine whether, even though the current temperature TEMP may have reached the TEMPLIMIT calculated in step 290, an override may take place to allow the temperature to drift yet further before driving back to TEMPSET following reoccupancy. This will be allowed to take place, thus effectively stretching the TEMPLIMIT, if the recovery time from the new "stretched" TEMPLIMIT is small enough compared to the drift time from the calculated TEMPLIMIT to the new "stretched" TEMPLIMIT. Equivalently, the system inspects whether the ratio of DRIFT to RECOV as defined in step 320 is greater than some predetermined drift-drive ratio DD RATIO. For instance, DD RATIO may be 5, which would mean that every five minutes of temperature drift (with the HVAC equipment off) would require only one minute of driving the equipment to return to the TEMPLIMIT point.

In practice, the closer the temperature of the space is to the ambient temperature, the higher the value of DD RATIO; for instance, very close to the ambient temperature, thirty minutes of drift time may require only thirty seconds of corrective (return) drive time. In this case, a 60:1 DD RATIO is realized, leading to large blocks of downtime for the HVAC equipment, and hence considerable energy savings.

Under such conditions, the user will want to set the "genius" mode and choose a DD RATIO value that leads to energy savings while not unduly inconveniencing occupants of the space. This will be empirically determined; certainly thirty extra seconds of drive time is acceptable, while twenty minutes would probably not be.

There are other ways of implementing the "genius" mode than expressing a DD RATIO value. For instance, drift may be allowed to occur past TEMPLIMIT whenever:

(a) the incremental temperature drift does not exceed a defined percentage of the allowed temperature drift range; and/or (b) the incremental recovery time does not exceed a defined percentage of the specified recovery time. Example (b) is essentially the same as the previous example, but stressing the inverse of DD RATIO—it may be more natural for a user to set the user-programmable value as, for instance, specifying that the incremental recovery time does not exceed 15% of the specified recovery time. Alternatively, as in example (a), the user may specify that the incremental temperature drift does not exceed 10% of the allowed drift range. In any of these cases, with the genius mode set, the system automatically increases the allowed maximum drift range past TEMPLIMIT by an amount that corresponds to the range of the calculated DD RATIO. The increased amount is thus limited by DD RATIO (and/or its equivalent under (a) or (b) above); if DD RATIO is 10:1, then the incremental temperature past TEMPLIMIT that the system allows the space to drift will be substantially that temperature for which the system calculates that the drive (recover) time to TEMPLIMIT is one-tenth or less of the drift time. (This calculation may be carried out in the same manner as in the above example for calculating RECOVMAX at step 290.)

If the genius mode conditions are met as in box 320, then the system follows loop E by proceeding to step 250, and turning off (or leaving off) the HVAC equipment. If DD RATIO is not large enough, the loop F is followed, at which time the HVAC equipment is turned on (or left on), and in both cases the method then proceeds to step 210.

In this basic form of the method of the invention, loops A and B (without the "space occupied" detection and test of steps 210 and 260) correspond to conventional approaches to HVAC control. When occupancy status has been taken into account in previous systems, it has been used to extend the limit of a range such as ΔTEMP, but the features of loop C (particularly step 290) have not hitherto been realized. The genius mode of loop E is a further improvement leading to yet greater energy savings.

It can be seen from the above that the method of the invention does not depend upon complex and potentially inaccurate modeling of a controlled space. Rooms and buildings to be climate controlled are constantly changing: doors and windows may be added, furniture, carpets and wall coverings are altered; the ambient microclimate will change with the seasons and as surrounding buildings, trees and the like are added or removed; and so on. Even during the course of a day, ambient conditions may change drastically as, for instance, an outside wall is exposed to direct sunlight for the afternoon but receives a chill breeze at night.

Not only ambient surrounding conditions change, but the HVAC equipment itself evolves: the equipment's capacity changes when filters are cleaned or become dirty, when coolants are added or diminish with use, when equipment is replaced or upgraded or downgraded, and when pipes and ducts are cleaned or become clogged or leaky. The capacity of the HVAC equipment to drive the enclosed space temperature depends upon all these variations, as well as variations in the enclosed space and ambient conditions discussed above.

The current invention automatically accommodates all of these changes by empirically determining the drift and drive equation parameters continually and in real time, so that reactions to changing conditions occur as fast as the changes themselves.

The user interface control 110 shown in FIG. 1A provides a convenient manner for the user to manipulate some of the variables used in the method of FIG. 2, by acting on user input 50 to interact directly with the program in the memory 40. Each of the arrows 120–140 represents a multiposition switch or continuous dial control. The "OFF/AUTO/Heat/Cool" switch 120 lets the user place the system in off mode, automatic mode, heating mode, or cooling mode, respectively. (Here, the "AUTO" setting would allow automatic switching between heating and cooling.) The temperature control 130 allows the user to specify TEMPSET by reference to a graduated scale 150, which shows an exemplary range of 65° F. to 90° F. (and which would preferably include finer gradations and temperature markings).

The energy savings control 140 is preferably a continuously variable dial. When the control 140 is set on "high", the values for RECOVMAX and TEMPMAX should be at some maximum, which minimizes the amount of time the HVAC equipment is running. When the control 140 is set on "low", RECOVMAX and TEMPMAX take on minimum values, which maximizes the comfort to the user but also uses more energy. For instance, the system manager may predefine a range of allowed values for RECOVMAX and TEMPMAX, and the user, by dialing the control 140, varies these smoothly and in concert with one another from the maximum values to the minimum values. In this embodiment, the user need not know what the absolute values for these variables are.

The control 140 may also interact with the program in memory 40 by setting the mode to genius or not. Thus, at some point in the scale towards "high" energy savings, the genius mode may come into operation.

The user interface control 110 is analog, and accordingly includes a conventional analog-to-digital converter (not separately shown) for each of the controls 140 and 150. The use of analog devices to control computer programs is well known, and any of a variety of standard equipment may be used.

A conventional digital interface may alternatively be used in any of the embodiments herein, with precise settings for temperature, RECOVMAX, TEMPSET and the other variables that are to be set.

Variations on the basic method

A. Detection and control of conditions other than temperature

The use of people and temperature sensors has already been discussed. Humidity sensors may be used in a manner equivalent to temperature sensors: a user may wish the humidity to remain in a particular range, and will set a "user set point" of humidity just as is done for the temperature in the embodiments already discussed. All of the variables appearing in box 200 of FIG. 2 are used, and the method variations discussed above are applicable, except that humidity is the controlled climate condition, rather than temperature, and the climate control equipment is humidifying/dehumidifying equipment rather than merely temperature control equipment. Of course, temperature and humidity may both be controlled by the system of the invention.

Thus, if the user specifies, for instance, a humidity of 70%, then if the humidity goes below that (or above 70% −0.5%, where ΔHUMIDITY=0.5), then the humidifier is turned on until the humidity climbs to the correct range again. If the controlled space is unoccupied, the humidity may be allowed to drift, just as temperature is, and the RECOVMAX and TEMPLIMIT (or here, HUMIDLIMIT) concepts described in connection with FIG. 2 are directly applicable. The "genius" mode also works in the same way.

Another application of the invention is to detect and control the concentration of gases in the atmosphere of the controlled space. For instance, in certain environments the buildup of carbon dioxide ($CO_2$) is a concern; and substituting carbon dioxide concentration for temperature in the method of FIG. 2 shows that the method is directly applicable to such a situation. Instead of controlling temperature, the climate control equipment in this case controls standard ventilation equipment and/or a conventional degasification unit to remove toxic or undesirable gases. Other gases that may be detected and controlled include radon, carbon monoxide, etc. Similarly, simply the rate of flow of air may be the controlled condition.

The invention may in like fashion be applied to any climate condition that can be influenced by equipment controlled by a computer. While it may be applied to lighting conditions (to control the switching on and off of lights in occupied and unoccupied rooms, respectively), it is particularly advantageous when applied to the control of a variable condition with some hysteresis effect, i.e. a condition that changes over some appreciable period of time (at least minutes rather than seconds).

B. Preventive maintenance indicator

For enclosed spaces acted upon by one controlled HVAC unit at a constant $C_{drift}$, the power effectiveness EFF may be defined in a relationship arrived at by applicant, namely:

$$EFF = (C_{drift} - C_{drive})/B_{drive}.$$

This relationship emphasizes the HVAC equipment's effect on the enclosed space, with the $B_{drive}$ denominator normalizing the measure of effectiveness EFF by compensating for the natural frequency ("τ") response of the space.

As a general rule, as climate control equipment efficiency decreases, the time it takes to change a condition (temperature, humidity, or other condition) a fixed amount increases.

The system of the invention can thus act as a preventive maintenance indicator by maintaining in memory the EFF and/or ($C_{drift}$, $C_{drive}$, and $B_{drive}$) values correlated with time. The relative efficiency of the climate control equipment from one time to another can then be determined whenever desired as the absolute efficiency changes.

The system can easily be programmed to record such an efficiency ratio regularly, such as daily, and from this an efficiency curve can be empirically determined. Such a curve can generally be fit to an equation $EFF = 100 \, e^{-Kt}$, where EFF is the peak (100%) efficiency, t is time, and K is an empirical parameter learned over time (with dimensions of inverse time).

This relative efficiency equation is updated and reported to the user via an output device as often as desired, preferably every time the new efficiency ratio is determined. In addition, once the efficiency equation is established, relative efficiency at a future time can be predicted. If the system manager specifies a minimum relative efficiency requirement, the system can thus notify with an output message or signal not only when the equipment is, in fact, below desired efficiency, but in advance can notify the manager when the equipment is expected to dip below the specified efficiency ratio. For instance, every day for two weeks in advance of the expected date, the system can issue a warning, such as a computer printout, email or other message; a blinking light on the base station and/or equipment itself; an audible alarm. A user query device may be provided, such as a button on the base station or equipment which, when pressed, displays on an adjacent screen the efficiency value.

Such warnings may be coupled with a probability of the efficiency failure, which may be determined by a least-squares fit or other curve-fitting scheme of the empirical data with the idealized equation $EFF = 100e^{-Kt}$. To predict likely efficiency decline past a predetermined minimum allowable efficiency, the system of the invention can be thus programmed to project the time at which the HVAC equipment is likely to go below that predetermined minimum, and output this time with a probability projection, such as the conventional "$r^2$" curve-fit value in a least-squares fit.

The forecasts of the system may then be used to create an equipment maintenance schedule for a multi-unit property (such as a hotel or a chain of hotels), thus increasing the efficiency of the property owner's maintenance schedule. It is a straightforward matter, given the above teaching, to author a program to: (1) run periodic efficiency tests (or regularly extract efficiency data from normal operation of the climate control equipment); (2) calculate the efficiency data, including relative efficiency; and (3) issue efficiency reports and maintenance schedules as desired.

The determination of HVAC system efficiency can lead to energy savings by notifying the system manager when the system is running inefficiently; when the inefficiencies are resolved, the temperature can be allowed to drift farther, because RECOVMAX can be met more easily, so that the equipment is overall running a smaller percentage of the time and the duty (holding) cycles have smaller (temporal) drive components.

C. Backward drive alert

When the system turns on the climate control equipment, this is in order to alter a given condition in the controlled space, whether temperature, humidity, gas concentration or other condition. It is known in which direction drift of the controlled condition has been tending, and this information can be used to further govern the use of the equipment.

For instance, it may happen that someone has left an outside window open to the controlled space. If this is the case, then an attempt to cool the space (on a hot day) may well fail. This may be discovered by the system of the invention by determining after a fixed period of operation of the equipment whether the temperature is changing under drive conditions in the same direction as it was under drift condition. Thus, if after N minutes (e.g. N=15) the temperature direction under drive is the same as it is under drift, the system infers that there is a serious leak from or to the space. Noting this "backward" drive, the system may be programmed to automatically turn off the climate control equipment to stop the obviously wasteful and hopeless expenditure of energy.

This is particularly valuable to hotels that want to turn off automatically an air conditioner or heater when a guest has left a window or sliding glass door open and has left the room. Some systems have hardwired sliding glass doors (onto balconies, for example, in tall hotels) with a switch that disables the HVAC system when the door is ajar or open. Such a system is expensive and troublesome to install and maintain, and for completeness such sensors must be placed at every opening to the room. The present system, on the other hand, automatically determines for any space whether there is likely to be a major leak somewhere on the enclosed space boundary (walls, ceiling, etc.), and can shut down the HVAC system immediately or after a predefined or learned period (see delay time learning algorithm below) under such conditions, with or without the presence of people in the enclosed space. For example, the system might wait 15 minutes in the presence of people, even with an apparent leak, to let the housekeeping staff clean the room with an open door, and then shut down the wasteful HVAC operation. Alternatively, the system might shut down the HVAC operation only when the space has an apparent leak and is unoccupied.

This embodiment is also applicable to humidity detection. It may be applied to gas impurities detection as well, although rather than shut down the ventilation equipment, an alarm could be sounded to indicate that the ventilation effort is not succeeding in ridding the space of the undesired gases.

Any of the above variations can be combined with an automatic report-generating program to notify the user or system manager of all time periods that "backward driving" took place.

D. Fixed drive temperature setting range

Given the high cost of energy used to heat and cool space, some property owners now prefer to limit the temperature range users (or renters) of their space can set for themselves. For example, some hotel room managers believe a temperature range of 64° F. to 80° F. degrees is sufficient to provide comfort to their guests when a room is occupied. Even if the HVAC equipment is capable of driving the temperature lower than 64° or higher than 80°, the present system can be configured to limit the temperature range to a desired range such as this one. The temperature could still drift beyond those limits, of course, as long as the recovery time constraints and savings goals are met.

Similar limits may be placed on any controlled condition, such as humidity. The limits may be specified as applying only when the space is occupied, or whether or not the space is occupied. A program designed to carry out the method of FIG. 2 can easily be adapted to provide such user-defined limits, such as by taking the limits as input from a manager's station-and, if a later user specifies a range outside that allowed, overriding the later-input range with the extreme of the limited range (such as substituting 64° for a user input of 60°). The manager will effectively have the override capability, since the manager can, from the base station, change the limiting range at any time.

E. Adaptive unoccupied inference delay time

When people leave an enclosed space, such as a hotel room, they may be leaving to get ice down the hall, to buy a newspaper at the front desk, to go to the bathroom in an adjoining, unmonitored room, or they may be leaving for an extended period. Rather than switch to "unoccupied" mode (as at step 260 of FIG. 2) immediately upon the room being vacated, the system can be programmed to delay for a period of time, such as N minutes (where N=15, for example), to be certain that the comfort requirements are satisfied in case the space's occupant returns soon. In FIG. 2, this would entail a determination at step 260 of whether the space (a) is unoccupied, and (b) has been unoccupied for N continuous minutes.

By storing records relating to space occupancy over many departure/return cycles, the system can learn how long to wait to ensure that a certain percentage P% (where P=90%, for example) of all or recent previous occupants do not return for at least M minutes (M=30, for example). For example, it may be determined that after 9 minutes of an unoccupied state, only 10% of the time do occupants return within the following 30 minutes; in this case, the "unoccupied inference delay time" can be set to 9 minutes, meaning that only after 9 minutes will the occupancy status of the system change to "unoccupied" (and proceed to box 280 in FIG. 2).

Thus, although the occupancy status of the room, strictly speaking, alters as soon as the person has left the room, the actual, long-term nonoccupancy status is not changed until after the expected delay time, after which the system can predict that the nonoccupancy will continue for a long period.

The method can be further improved by establishing two delay times, one for when the space is lit and one for when it is dark. Dark delay times may be longer because occupants are sleeping and the detectors notice their movement less frequently. This variation on the method enables the system to minimize the delay time to engage and maximize energy savings, while minimizing the likelihood that occupants will be inconvenienced by an uncomfortable temperature when they continue to use and occupy the space.

F. Savings/usage meter

When the system holds the temperature at the maximum drift boundary TEMPLIMIT, the HVAC system runs for some percentage of the total cycle time [on/-(on+off)]. The system can calculate what this figure would be if it were holding the temperature at the user set point, and compare the two percentages. For example, at the drift boundary the equipment might be on for 4 minutes and drift for 16 minutes in a cycle, for a proportion of 20% [4/(4+16)]. At the same time, it might be determined that if the system tried to hold the temperature at the user set point, it would be on for 12 minutes and off for 6 minutes, for a proportion of 66.67% [12/(12+6)].

The amount of energy savings is the user set point temperature proportion (the 66.67% figure above) minus the drift temperature proportion, or 66.67% −20% [⅔−1/5=7/15], or 47%. In this example, in one cycle at the drift boundary, the savings amount to 47% times 20 [4+16] minutes, or 9 ⅓ minutes of run time, where the HVAC system is off when it would have had to run to hold at the user set point.

The energy savings additionally includes an amount represented by the following:

(TEMPSET duty cycle)*(drift time to TEMPLIMIT) minus (1−TEMPSET duty cycle)*(drive time from TEMPLIMIT to TEMPSET), where the TEMPSET duty cycle is defined as the (on−time) divided by (on+off) time) in maintaining the temperature at TEMPSET. It is a straightforward matter to calculate and include this savings amount in the output from the system to the user.

The system of the invention can be programmed to store these figures at regular intervals, such as every hour, and to generate a report to be output for the system operator, reflecting the aggregate savings in total time of equipment operation, and in addition the proportion of the total time the equipment would have had to run if the temperature were always held at the user set point. Finally, it is an uncomplicated matter to configure the program to determine the wattage output that would have been required in the latter case, since the equipment's power use rate generally is known, or may be determined empirically by a power meter, and the power consumption figures may be digitized and input as data to the computer 20 to arrive at actual power savings figures. These may easily be translated into figures as to money saved, for output in a report to the system operator.

Following is an application of the savings calculation to the example used earlier, wherein the drift and drive equations were determined to be:

Drive Equation:
$T=68+12*e^{-t/300} \rightarrow t = -300*ln[(T-68)/12]$

Drift Equation:
$T=90-20*e^{-t/720} \rightarrow t = -720*ln[(T-90)/(-20)]$

The cycling drift and drive times are now calculated for holding (1) at the recovery time drift temperature boundary and (2) at the user set point, as follows:

F.1. At the recovery time drift temperature boundary (6 minutes→76.11 degrees)

For this example, it is assumed that the temperature is held to 76.11°±0.5° degrees.

| Drive time | $T_1 = 76.11 - 0.5 = 75.61$ | $t_1 = 136.63$ |
|---|---|---|
| | $T_2 = 76.11 + 0.5 = 76.61$ | $-t_2 = 99.59$ |
| | | 37.04 seconds |
| Drift time | $T_1 = 76.61$ | $t_1 = 288.88$ |
| | $T_2 = 75.61$ | $-t_2 = 237.02$ |
| | | 51.86 seconds |

The total (drift+drive) cycle time is thus 37.04+51.85=88.90 seconds, while the drive portion of the cycle time is 37.04/88.90=0.417 or 41.7% of the total cycle time.

F.2. At the User Set Point (70 degrees)

The same ΔTEMP is used here as at the drift boundary (in this example, ±0.5 degrees) to calculate the cycle that would be required if the temperature were being held at the user set point:

| Drive time | $T_1 = 70 - 0.5 = 69.5$ | → | $t_1 = 623.83$ |
|---|---|---|---|
| | $T_2 = 70 + 0.5 = 70.5$ | → | $-t_2 = 470.58$ |
| | | | 153.25 seconds |
| Drift time | $T_1 = 70.5$ | → | $t_1 = 18.23$ |
| | $T_2 = 69.5$ | → | $-t_2 = -17.78$ |

|                |
| -------------- |
| -continued     |
| 36.01 seconds  |

The total (drift+drive) cycle time is thus 153.25+36.01=189.26 seconds, while the drive portion of the cycle time is 153.25/189.26=0.810 or 81.0% of the total cycle time.

F.3. Savings

At the drift temperature boundary, the equipment is driven a smaller percentage of the total cycle time than at the user set point. For an hour, or any given period, the (difference in drive times) multiplied by the (cost to operate the HVAC equipment) yields the total amount of savings. For example, if the system saves 20 minutes per hour, and it costs $0.15 per hour to operate the HVAC equipment, then the savings amount to 20/60 * $0.15=$0.05 per hour using the present system. Ten hours of similar saving per day for thirty days saves $0.05 * 10 * 30=$15.00 per month. This can be a very significant amount both relative to the total cost of running the equipment and taking into account that for large organizations, the savings per temperature control unit is multiplied manifold.

In this example, with (User Set Point$_{Drive\ Proportion}$) minus the amount (Drift Boundary$_{Drive\ Proportion}$)=0.810−0.417=0.393, the saving amounts to 0.393 times the total elapsed time. For every 60 minutes at the drift boundary, the equipment is driven 60*0.417=25.0 minutes. If the temperature were held at the user set point, the system would have to drive 60*0.810=48.6 minutes. Thus, the system saves 60*0.393=(48.6−25.0)=23.6 minutes of drive time per hour when the temperature is held at the drift boundary rather than at the user set point.

Gathering this data over days and months, the system accumulates: (a) actual drive time; (b) calculated drive time without the present system (calculated as if holding at the user set point); (c) the difference between these two drive times (=Drive Time Savings); and (d) this difference divided by the calculated drive time without the system (=Savings Proportion achieved by the present system).

G. Equipment recycle limitation

Minimum Off Time. Compressors build up pressure in the HVAC tubing. When the HVAC equipment is turned off, the pressure slowly leaks out, taking 2 to 4 or more minutes. If one tries to restart the compressor before the pressure leaks out, electric current runs into the compressor electric coils, trying without success to overcome the high back pressure. Frequently, the compressor's electric coils overheat and burn out, causing complete equipment failure and the need for repair.

The present system solves this problem by including in the program a governor that, for compressor-based HVAC equipment, automatically keeps the compressor off for a minimum period of time between on cycles, thus preventing premature burn out due to too-frequent recycling. An appropriate such minimum period of time is 4 minutes as the minimum off-time, but this time may be decreased for some newer HVAC equipment.

Maximum Recycle Frequency. Each time a compressor is turned on, there is an electric current inrush, much like the acceleration forces required to move an automobile from rest to motion. The stress on the HVAC's electric components carrying this current is highest when overcoming the startup inertia and lowest when maintaining the continuing pumping action, much like the wear and tear difference for an automobile when acceleration is compared with cruising. The less often HVAC equipment undergoes startup, the longer the equipment will last.

The present system in a preferred embodiment automatically limits the recycling frequency of compressor-based equipment to R times per hour, which means a minimum cycle lasts 60/R minutes. One may, for instance, set R=6, so that up to 6 recycles per hour are allowed, or a minimum of 10 minutes for one on/off cycle. This could trigger the temperature range above and below a temperature holding level beyond the input or preprogrammed ΔTEMP to be increased beyond, for instance, a standard ±0.5° F. value, so that the holding range grows from ±0.5° to ±0.75 degrees or greater to achieve 10-minute minimum cycles.

H. Zero-voltage switching

The voltage at which alternating current is delivered to equipment varies along a sine wave from amplitude peaks to zero-voltage crossovers. The present system can be configured to detect the zero-voltage crossover and automatically switch on the electric current at this point, minimizing the chance of sparks and decreasing equipment stress which can occur due to sudden changes in electromotive force.

Figure 12:
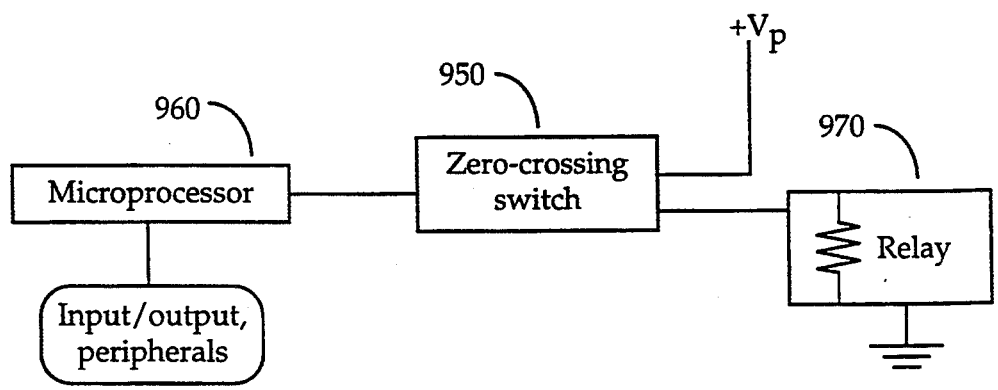
FIG. 12 shows a zero-crossing circuit for use with an embodiment of the invention.

FIG. 12 shows a suitable circuit for zero-crossing switching, which uses a conventional integrated circuit 950 with an internal zero-voltage sensing switch (with the zero switching being performed by hardware; no microcode is required). The IC 950 is coupled to a microprocessor 960, which is connected to outputs, inputs and peripherals as needed and may be any of the microprocessors or microcontrollers discussed herein for controlling HVAC or climate control equipment. The IC 950 is coupled to ground via a conventional relay 970. Outputs from the microprocessor 960 are thus automatically synchronized to the line voltage.

I. Power factor correction

Voltage and current are seldom delivered perfectly in phase to users. When they are not in phase, some amount of current is lost. Power is equal to the product of voltage and current, so when they are in phase, optimum power delivery is possible. The present system automatically adjusts the current phase to synchronize with the voltage phase, achieving optimum power delivery.

The phase angle between the voltage and current can be measured in a conventional manner. One method is to sample both the voltage and current signals to produce two inputs into a (multiplication) product detector integrated circuit. An output of the product detector is a signal whose amplitude varies with phase angle. This phase-proportionate angle is used as an input to an analog-to-digital (AD) convertor of a microprocessor, which controls a variable capacitor to tune the phase angle and power factor to an optimal value.

J. Multistage HVAC optimization

Figure 10:
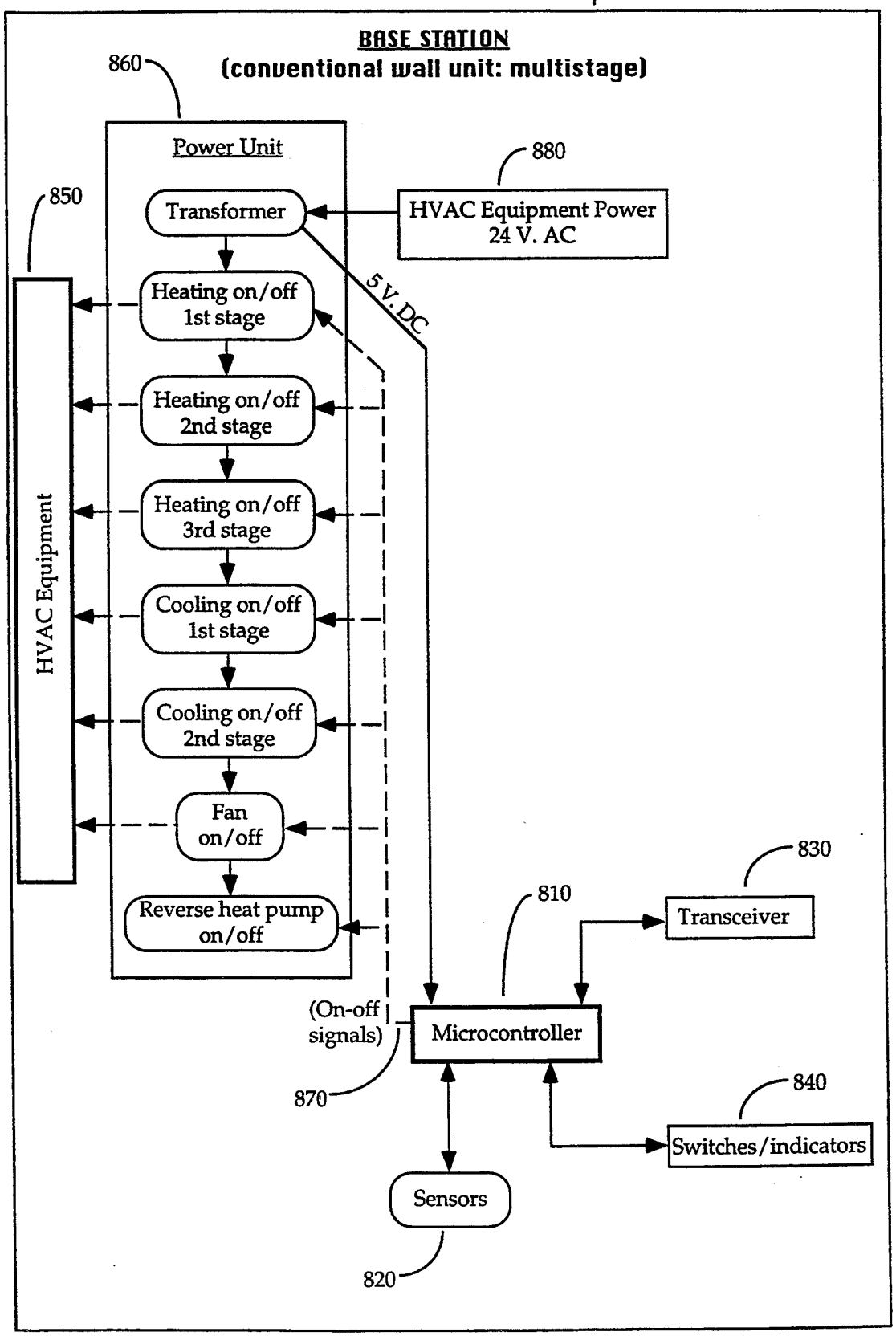

On multistage HVAC equipment, second and even third levels of equipment are turned on when required to move the temperature back to the user set point (see FIG. 10). For example, when it is very cold, many heat pump systems (using the heat pump as stage 1) turn on electric coils and move air over them to add heat to that provided by the heat pump. These electric coils are considered a second heating stage. Additional heating stages in very frigid climates may include fuel oil burners and other apparatuses. Usually, the first stage is more efficient and thus less costly to operate than the second stage, which in turn is more efficient and less costly to operate than the third stage. In some climates, users are urged to operate their first stage HVAC equipment all the time to prevent the occupied space temperature from reaching a temperature where the more expensive stages are called upon.

The present invention is in a preferred embodiment configured to learn the drive curves for the first stage, for the first stage plus the second stage working together, and for the first, second, and third stages working together. Relative cost factors for these different stages and for different multistage configurations and geographical regions are stored at the base station (in the computer memory), and may be periodically updated. Given the drive curves and relative cost factors, the system can determine an optimum (minimum cost) energy savings boundary. This can be done, for instance, by determining what the duty cycle to maintain the temperature (TEMPSET or TEMPLIMIT, as the case may be) would be for each of the stages.

Thus, the system first determines what the duty cycle would be at stage 1, then at stage 2, then at stage 3 (if there is one). Since the stage 1 power usage is lower, the duty cycle will be greater than at stage 2, where the power output is higher. The total energy consumption is (duty cycle) * (power output) for any given stage. For instance, if stage 2 uses 1.2 times the power of stage 1, then the break-even point, i.e. the point at which the total energy cost is the same regardless of whether stage 1 or stage 2 is used, is the point at which:

(duty cycle at stage 2)=(duty cycle at stage 1)/1.2

If the left side of this equation is less, then it is economical to progress to stage 2, since the time saved in lowering the duty cycle more than compensates for the extra energy consumed per unit time. If the left side is greater, then the system optimally should remain at stage 1.

This same approach is used to determine also whether it would be economical to move to stage 3. Whichever stage leads to the lowest energy consumption should be used, and the system can easily be configured (by simple programming) both to make this determination and to move to the new stage, and furthermore to constantly monitor the situation, using the learned and updated drift and drive curves, to determine at any given time whether a different stage should be used.

Moreover, although the system can be programmed to hold at the first stage drive boundary, conditions will sometimes be such that the temperature should be allowed to drift farther out, when the savings exceed the return drive cost of second- or third-stage help. The learned multistage curves combined with relative multistage cost factors provide the precise information needed to maximize energy savings in multistage systems.

K. Remote base station parameter settings

Parameters that are used as input (such as for the method of the invention) are preferably alterable remotely. Such parameters may include recovery time, maximum drift range, minimum recovery range, and operating mode (on, to operate as in conventional systems; "smart"—for using loop C of FIG. 2; and "genius"). FIG. 1A, discussed below, shows one embodiment for accomplishing this, while FIG. 11 (discussed below) shows another.

One method of remotely setting such parameters is to transmit these values over the house wiring to specific, regional, and global units. Another is to transmit these values over the air (by radio or infrared) to intermediate transceivers located in regionally defined base stations, which in turn transmit to all the base stations in their region. This allows the operating values to be changed from any computer in the building or even a laptop, without entering rooms, and with transmission security provided by the present system's ID verification protocols.

L. Extended periods of nonoccupancy

The system of the invention may be modified to keep track of the length of occupancy and lack thereof over time, and to store this information for the system manager's review. This information can be used to provide further savings of energy by programming the system with a predefined schedule of TEMPSET variations when the controlled space has been unoccupied for long periods.

For instance, if the space has been unoccupied for 24 hours or more, the system may institute a provisional PROVTEMPSET which is 5° F. (or a certain percentage) greater than the programmed TEMPSET (for cooling settings), or 5° F. (or, again, a predefined percentage) less than the programmed TEMPSET (for heating settings). In the cooling situation, the system will then allow the space to climb up to 5° hotter than it would if the space had been occupied at any time within the preceding 24 hours. After another 24 hours, an additional 5° (or percentage) can be added to PROVTEMPSET, and so on. After a week, the system could go into a temporary suspension of operation altogether, until operation is again triggered by someone reentering the space. This last variation is preferably constrained by fixed absolute boundaries, such as 40° F. to 100° F., to prevent heat or cold damage to fixtures or furnishings in the controlled space. Any of the foregoing variations in settings and times for implementing them can, of course, be altered to apply to a given setting.

The same principle can be applied to variations on RECOVMAX, where the maximum allowed recovery time is allowed to expand by a certain percentage or number of minutes each day or other block of time, and again the system may be programmed to suspend operations after a predetermined large period of time, until reset manually or when someone returns into the space.

A simpler version of this variation is to allow users to program times that they will be away for known periods, and thus cease or limit operation of the HVAC equipment for such periods.

Base stations and sensors: FIGS. 6–10

Following is a discussion of preferred hardware configurations for implementing the invention, directed to the use of temperature sensors. Other sensors as discussed above can be substituted for or used in addition to temperature sensors, with appropriate changes to the control program. For instance, as mentioned, if a $CO_2$ sensor is used in addition to the temperature sensor, then the program is configured to drive only the ventilator subunit of the HVAC equipment, i.e. the fans alone. FIGS. 6–11, then, while directed to a temperature-control embodiment, are generalizable to add as many sensors of other types as desired.

In common to all of these embodiments is the acceptance of simple user instructions, including the user set point or temperature range when people are present and the recovery time when they return from an absence. In each case, the systems automatically achieve the climate condition (e.g. temperature) and recovery time goals while minimizing wasteful equipment operation when people are absent.

FIG. 6 is a block diagram of a system 500 using a base station 510 with multiple remote sensor units 520–540. These sensors may include the types of sensors illustrated in FIG. 1 for sensing temperature, occupancy, and other conditions such as light intensity and presence of $CO_2$ or other gases. Also shown, as in FIG. 1, are input/output device(s) 550 coupled to the computer of the base station 510, and the climate control equipment 560.

A suitable remote sensor unit 520 is shown in the block diagram of FIG. 7, and communicates with the base station 510 by radio, infrared, house wiring, hardwired connections, or other equivalent means. A microcontroller 570 is used, and may, for instance, be a PIC16C54 microcontroller (of the PIC16C5X series, made by Microchip Corporation), which is a commercially available product programmable in assembly language. It is powered by a power source 580, which for remote sensors that communicate by wireless means or are positioned in inconvenient locations, preferably has batteries that are recharged by solar cells as to the power source. This allows for lower maintenance effort and saves on energy costs for the power of running the remote sensor.

The sensor unit 520 also includes one or more sensors 590, which may include any combination of the following:

Types of sensors:

1. people sensors:
   passive infrared (PIR)
   acoustic
   microwave (preferably combined with PIR)
   laser
2. temperature sensors
3. humidity sensors
4. day/night (photocell) detectors
5. pollutant concentration meters
6. airflow meters Some of these have already been discussed. Airflow meters can be used to ensure a minimum volume rate or velocity of airflow through a space that must be well ventilated.

Figure 8:
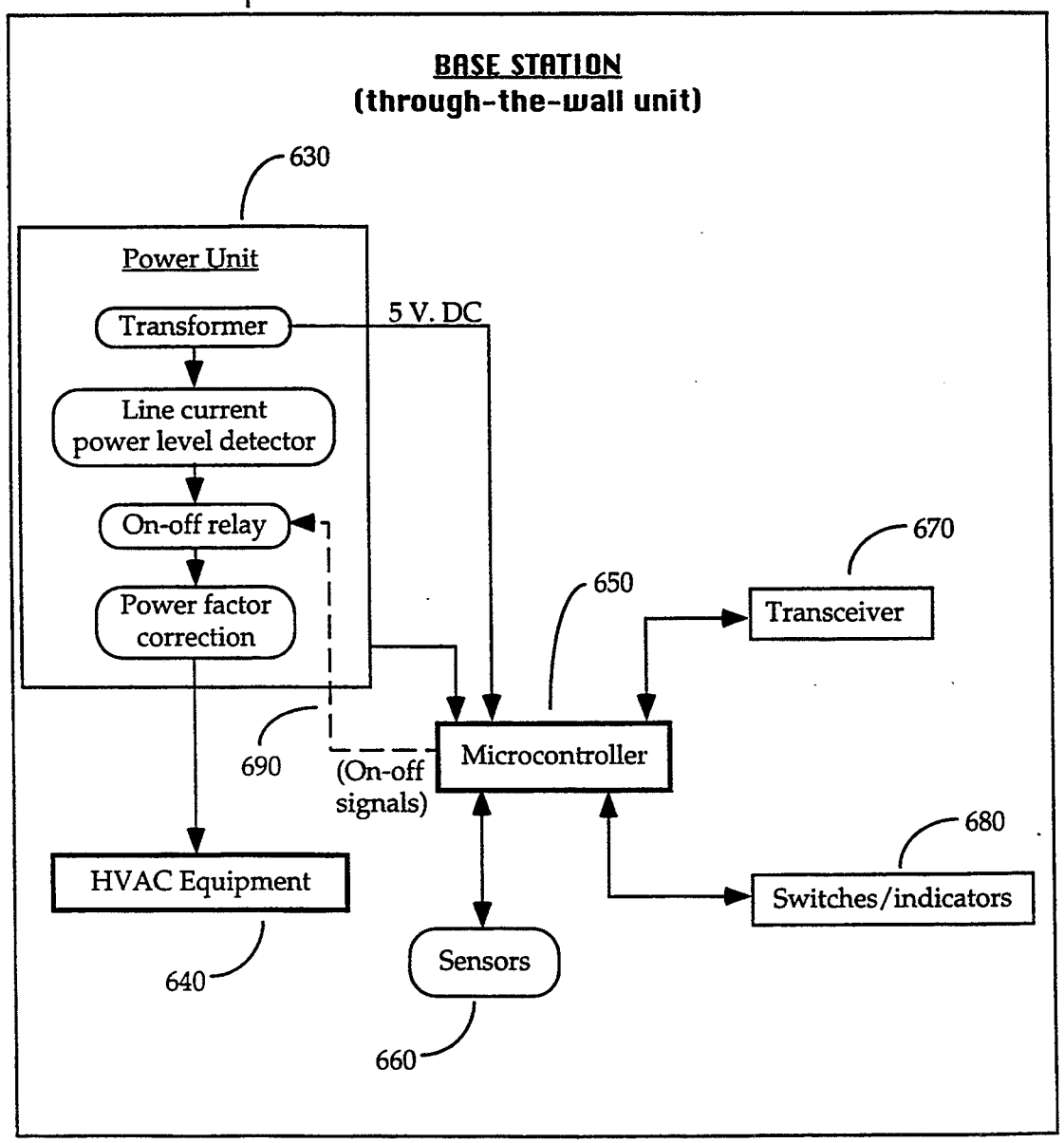
FIGS. 8-10 are block diagrams of various embodiments of the base station.

FIG. 8 shows a base station 620 in cooperation with which the transmitter 600 and switches/indicators 610 shown in FIG. 7 can be used, in an embodiment of the invention using a through-the-wall type of air conditioner and/or heater (e.g., a typical hotel room air conditioner). The base station includes a conventional power unit 630 which is plugged into a wall socket and powers the HVAC equipment 640 and the microcontroller 650, which may be any of a number of commercially available microcontrollers, such as the Texas Instruments TMS 370 Series microcontroller (which is programmable in the C++ language).

The microcontroller 650 switches the HVAC equipment 640 on and off via control line 690 connected to the power unit 630. One or more sensors 660 may be coupled to the microcontroller 650, in addition to or instead of the sensor(s) 590 of the remote sensor unit 520 shown in FIG. 7.

A transceiver 670 is controlled by the microcontroller 650, and communicates with the remote sensor unit 520. Switches/indicators unit 680 is also coupled to the microcontroller 650. In the preferred embodiment, the microcontrollers 650 (of the base station 620) and 570 (of the remote sensor unit 520) are programmed to work in cooperation such that the remote sensor identifies itself to the base station in the following manner. A user presses a programmed switch at the switches unit 680, which causes the microcontroller 650 to ready itself to receive a remote sensor i.d. via the transceiver 670. Any remote sensor that sends such a user i.d. within a predetermined time is "registered" with the base station, and will from then on will be recognized and accepted when it communicates with that base station, which will collect sensor readings from the remote sensor(s) in question and respond to them. Thus, the user presses the receive-user i.d. switch at the unit 680, and then within the predetermined time (such as 90 seconds) presses a preprogrammed send-user i.d. switch in the switches unit 610 (see FIG. 7). This causes the remote sensor's microcontroller 570 to transmit the user i.d. code for that sensor to the base station. From then on, the base station is receptive to sensor information from that remote sensor.

This ensures that, if two remote sensors are within radio or other transmission range of two different base stations, they may reliably be linked to one base station each.

Figure 9:
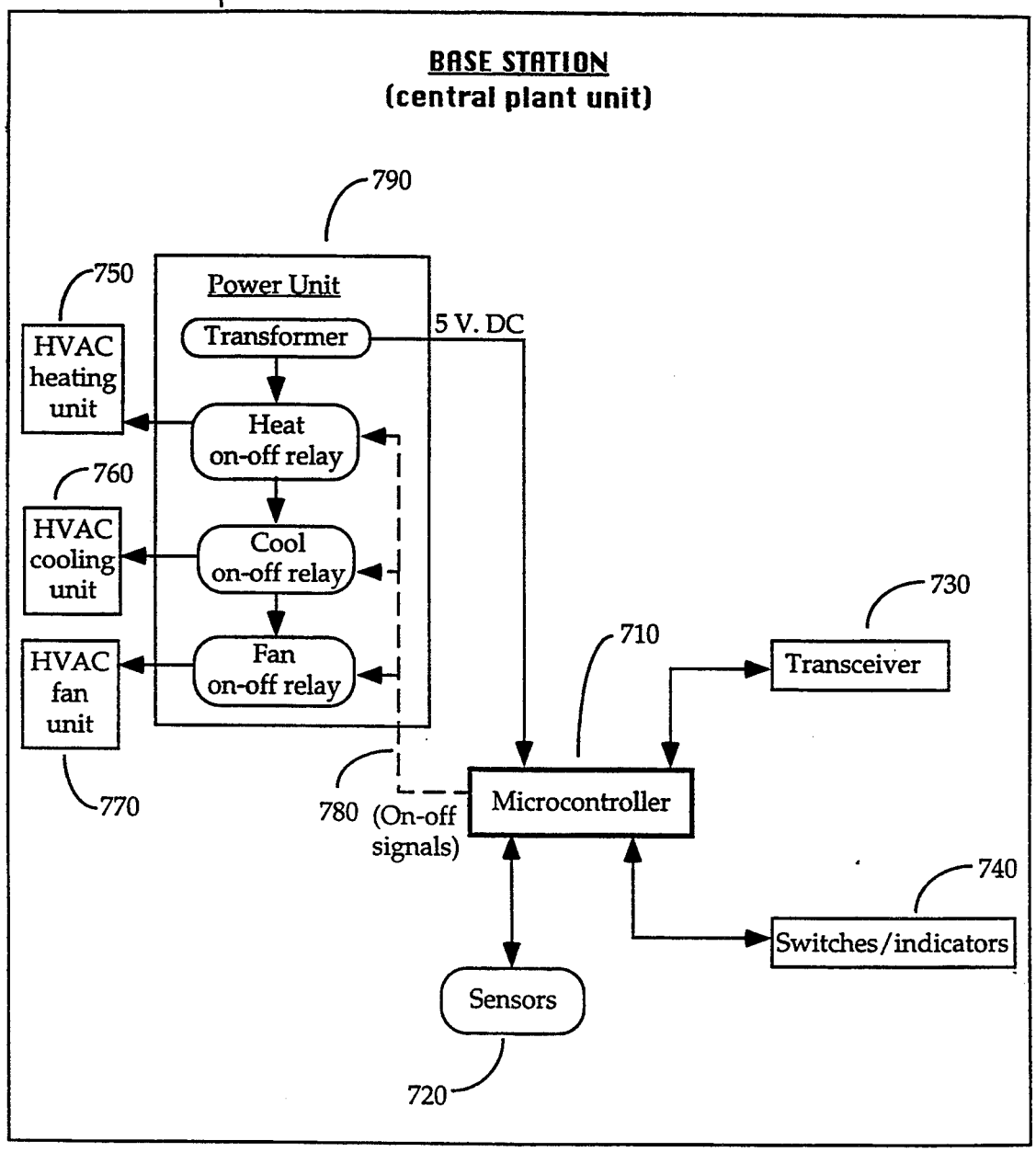

Other useful switches or controls in the unit 680, for implementing the above-discussed features of the invention, include:
   mode (on, smart, genius)
   TEMPSET control (for user set point)
   TEMPMIN control
   TEMPMAX control
   $\Delta$TEMP control
   RECOVMAX control
   DD RATIO control
Useful indicators (lights or LEDs, for instance) are:
   on/off indicator
   receiving/received user i.d. indicator
   remote sensor weak signal indicator
   remote sensor failure indicator FIG. 9 shows a base station 700 which is suitable for a central plant HVAC unit powered from standard line current, such as is conventional in commercial buildings, typically running off 110/220 VAC. The base station 700 would replace the wall unit for such a central plant unit, and includes a microcontroller 710, sensors 720, transceiver 730 and switches/indicators unit 740 which are in essential respects identical to similarly numbered features of FIG. 8, except that the microcontroller 710 must of course be programmed differently so that it controls central HVAC equipment instead of a single through-the-wall unit. The base station 700 cooperates with remote sensors in the manner described above, via the transceiver 730.

The HVAC equipment in this embodiment includes a heating unit 750, a cooling unit 760, and a fan unit 770, all of which are conventional HVAC equipment, and may include a system using hot and cold water pipes and a fan, or compressor/burner equipment with a ventilator fan, or other standard devices. The microcontroller 710 controls the HVAC equipment 750–770 individually via on-off control lines 780 controlling heating, cooling and ventilating (fan) relays, respectively, of power unit 790.

FIG. 10 is a block diagram of a configuration of a base station 800 suitable for conventional multistage HVAC equipment 850 (such as a standard wall-type unit), where three stages of heating and two stages of cooling are provided and are controlled by a multistage power unit 860. The use of multistage HVAC equipment is desirable to provide greater degrees of heating and cooling (with greater power consumption) when necessary, while using the lower stages of operation for milder conditions or where slower heating or cooling is acceptable.

In this embodiment, a microcontroller 810 has a memory storing the program, as with each of the other embodiments (such as in FIGS. 8 and 9). Sensors 820, transceiver 830 and switches/indicators unit 840 may be essentially identical to the corresponding units 720–740 shown in FIG. 9, but they and the microcontroller 710 and its program are adapted as necessary to the functions of the multistage HVAC equipment 850. Each of the stages is individually controlled by the microcontroller 810 via on/off lines 870 operating the individual power stages shown in the power unit 860, which may be powered by a conventional 24-volt unit 880.

It is a straightforward matter to configure a program to implement the invention to learn the drift and drive curves (as in FIGS. 4–5) for each of the multiple stages of operation, and to store the operating parameters and calculate efficiency data and for each of these stages over time.

Each of the base stations shown in FIGS. 8–10, and other conventional base stations, implements the method of the invention illustrated in FIG. 2 by means of a program stored in memory of the respective microprocessor. Other types of base stations will be needed to control different types of HVAC equipment not illustrated here, but the principles of the present invention apply in each case, since for any heating and cooling operation there will be associated drift and drive curves that can be learned, and based upon this empirical data the operation of the equipment can be efficiently controlled.

Figure 11:
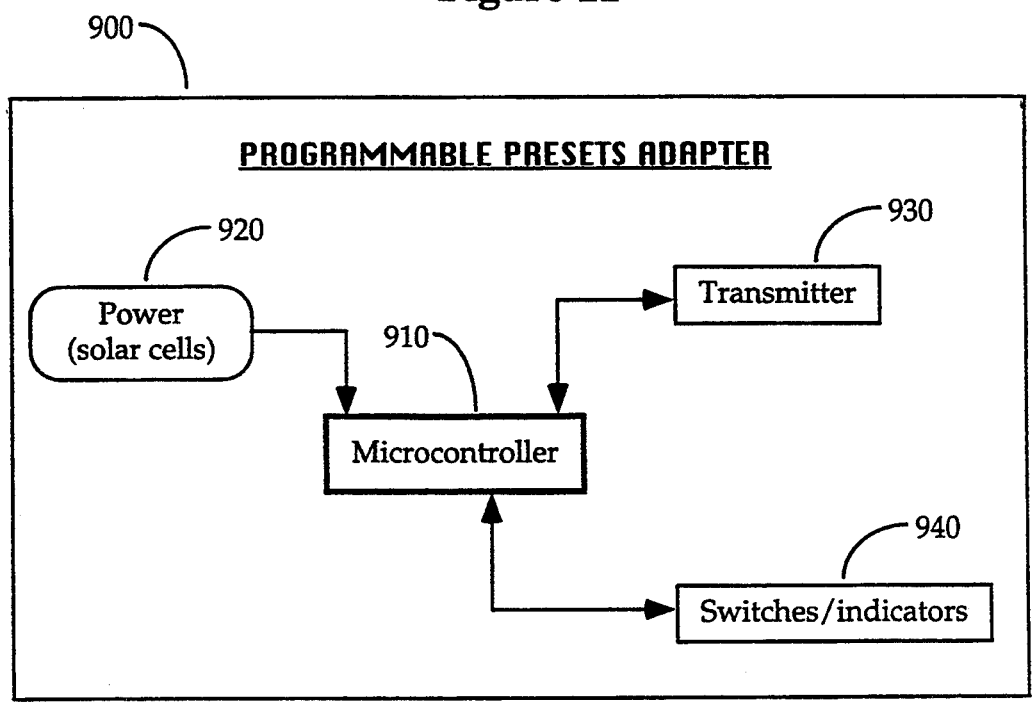
FIG. 11 is a block diagram of a programmable presets adapter for use with the invention.

Programmable presets: FIG. 11

FIG. 11 shows a presets adapter 900 allowing programmable, user-specific presets for the system. It includes a suitable microcontroller 910 powered by a power unit 920 and coupled to a transmitter 930, which may be hardwired to the base station in connection with which the adapter is used. A switches/indicators unit 940 is also provided, coupled to the microcontroller 910. As with any remote sensor, the microcontroller includes a microprocessor and a memory for storing and executing a program for carrying out the functions of the invention.

In this case, the functions are to provide a station whereby a user can set preferred temperatures for different times and days, and can also override these settings. Whenever a user overrides a given programmed schedule of temperatures, the schedule reverts to the programmed settings at the next time indicated. Thus, if a user sets the temperature to go to 70° F. at 8:00 a.m. on Saturday and then down to 65° F. at 11:00 p.m. Saturday, the system will automatically set TEMPSET at 70° F. at 8:00 a.m. Saturday. If the user overrides the setting on Saturday afternoon, turning the temperature up, say, to 75° F., the predetermined schedule will come into effect at 11:00 p.m. as programmed, and the temperature will still drop to 65° F.

The adapter 900 thus includes switches for allowing such programs to be preset by the user, along with displays to facilitate the programming, namely:

Display temperature
time
days of week and/or dates

Switches temperature (manual up/down)
time (manual up/down)
set day/date (up/down)
set [temperature/time/day-date] into program
cancel [temperature/time/day-date] from program
display programmed [temperature/time/day-date]

These switches and displays are, of course, variable according to the user's wishes, and any standard or custom programming interface may be provided, including, if desired, simply a keyboard interface to the microcontroller 910. Indeed, with any of the microcontrollers used to carry out features of the invention, the interface may be a keyboard and/or mouse as is conventional with personal computers. The type of interface represented by the block diagram of FIG. 11 is, however, preferable for a commercial HVAC control unit.

Given the foregoing teaching on the method of FIG. 2 and its variations, and the block diagrams of the various possible configurations for executing the functions of the invention, one skilled in the art can readily adapt a large variety of conventional processors, memories, user interfaces and computer/HVAC interfaces to implement the invention. No special-purpose hardware is required. The programming required is routine and relatively simple, and can be accomplished in any one of a number of languages, such as assembler, FORTRAN, BASIC, C++ or other conventional languages.

What is claimed is:

1. An apparatus for governing levels of an environmental attribute of a room by controlling operation of an environmental control unit for affecting said levels of said attribute of the room, said apparatus including an interface coupled to said environmental control unit to controlling the operation thereof by control signals, the apparatus comprising:

a controller including a processor coupled to a memory, the memory storing an environmental control program including program instructions for controlling said operation of said environmental control unit by generating said control signals and further storing data including a first drift relationship, a first drive relationship, a predetermined set point representing a predetermined level of said attribute, a predetermined maximum range relative to said set point, a predetermined minimum range relative to said set point and a predetermined maximum recovery time, the controller further including a timer coupled to said processor for timing events related to said environmental control, said events including generation of said control signals and reception of signals representing said levels within said room;

an input device coupled to said controller for inputting at least one of said predetermined set point, maximum range, minimum range and recovery time;

an environmental attribute sensor coupled to said controller for providing, at any given time, one said signal representing the level of said attribute within the room; and an occupancy sensor coupled to said controller for determining whether the room is occupied, and for sending a said control signal to the controller to take one of a first action and a second action, the first action being taken if the room is unoccupied to allow said level in the room to drift towards an ambient level of said attribute in a region adjacent the room and the second action being taken if the room is occupied to operate said environmental control unit to drive said attribute level in the room away from said ambient level;

wherein the environmental control program includes instructions to allow said drift only to said maximum range when the space is unoccupied, and then, when reoccupied, to activate the environmental control unit for driving the attribute level in the room towards a target level of said attribute within said minimum range of said set point; and wherein said maximum range is limited such that an amount of drive time for said environmental control unit to drive said attribute level in the room from said maximum range to said target level of said attribute is no greater than said predetermined maximum recovery time.

2. The apparatus of claim 1, wherein:
said attribute of said room is temperature;
said environmental attribute sensor comprises a temperature sensor; and
said environmental control unit includes at least one of a heating unit, an air conditioning unit and a ventilating unit.

3. The apparatus of claim 1, wherein:
said attribute of said room is humidity;
said environmental attribute sensor comprises a humidity sensor; and
said environmental control unit includes at least one of a humidifier and a dehumidifier.

4. The apparatus of claim 1, wherein:
said attribute of said room is presence of a predetermined gas;
said environmental attribute sensor comprises a sensor for determining amounts of said gas in said room; and
said environmental control unit includes at least one of a ventilating unit and a degasification unit.

5. The apparatus of claim 1, wherein:
said attribute of said room is air flow;
said environmental attribute sensor comprises an air flow meter; and
said environmental control unit includes a ventilating unit.

6. The apparatus of claim 1, wherein said first drift relationship and first drive relationship stored in said memory comprise relationships empirically determined for said room and the environmental control unit.

7. The apparatus of claim 6, further including an output device coupled to said controller for outputting information to a user, wherein:
said memory further stores a second drive relationship, determined at a time later than the time of determining said first drive relationship; and
said program further includes instructions to output an alarm signal to said output device when the ratio of said second drive relationship to said first drive relationship exceeds a predetermined tolerance ratio.

8. The apparatus of claim 6, wherein said program further includes instructions for measuring efficiency of the environmental control unit and for outputting information reflecting said efficiency to a user.

9. The apparatus of claim 8, wherein said instructions for measuring efficiency include instructions for determining an efficiency rating calculated as:
the difference between (1) a drift level of said attribute towards which the room drifts when the environmental control unit is off and (2) a drive level of said attribute towards which the room is driven when the environmental control unit is on;
said difference being normalized by a factor representing the time rate of drive of levels of said attribute with the environmental control unit on.

10. The apparatus of claim 8, wherein said instructions include instructions for determining changes in said efficiency rating over time.

11. The apparatus of claim 6, wherein said program further includes instructions to cease activation of said environmental control unit if, after a predetermined maximum drive time, a direction of change of said attribute level under drive of said environmental control unit is the same as a direction of change of said attribute level when said environmental control unit is not driven.

12. The apparatus of claim 6, wherein said program further includes instructions to cease activation of said environmental control unit if, after a predetermined maximum drive time, the level of said attribute in said room is not closer to said minimum range by at least predetermined margin.

13. The apparatus of claim 6, wherein:
said first drive relationship is determined by detecting the level of said attribute at each of a first time and a second time during a drive operation of said environmental control unit; and
said first drift relationship is determined by detecting the level of said attribute at each of a third time and a fourth time during a drift period for said environmental control unit.

14. The apparatus of claim 1, wherein the control program further includes instructions to automatically provide an override mode for allowing said attribute level in the room to drift outside said maximum range to a supramaximum level before driving said environmental control unit, upon satisfaction of at least one predetermined criterion.

15. The apparatus of claim 14, wherein said at least one predetermined criterion includes a determination that a ratio of the drive time of the attribute level from said supramaximum level to within said maximum range to the drift time from said maximum range to said supramaximum level is less than a predetermined amount.

16. The apparatus of claim 1, wherein program further includes instructions to establish an expected delay time of nonoccupancy of the room.

17. The apparatus of claim 16, wherein the program further includes instructions to override said predetermined maximum recovery time based upon said expected delay time.

18. The apparatus of claim 16, wherein said expected delay time is established by determining a first minimum amount of time that the room is unoccupied for a predetermined percentage of predefined time periods.

19. The apparatus of claim 1, wherein said program further includes instructions to provide a minimum off time for the environmental control unit.

20. The apparatus of claim 1, wherein the environmental control unit is configured for being driven at each of a plurality of different power settings.

21. The apparatus of claim 20, wherein said program includes instructions for determining which one of said power settings requires the lowest energy consumption to maintain the level of said attribute in said room at said set point, and for operating said environmental control unit at said one power setting.

22. The apparatus of claim 20, wherein each of said power settings is empirically determined for the room and the environmental control unit.

23. The apparatus of claim 1, further including a second drift relationship and a second drive relationship stored in said memory, said second drift relationship and second drive relationship being determined for the room and the environmental control unit after said first drift relationship and first drive relationship, wherein said program further includes instructions to recalculate said maximum range and said maximum recovery time based upon said second drift relationship and second drive relationship.

24. The apparatus of claim 1, wherein said program includes instructions for limiting the frequency at which the environmental control unit may be alternately turned on and off.

25. The apparatus of claim 1, wherein said maximum range is further limited to a preset maximum range stored in said memory.

26. The apparatus of claim 1, further including:
an output device coupled to said controller for outputting information to a user, wherein said program further includes instructions for maintaining a first record of an actual running time that said environmental control unit is operated and a second record of a projected running time that said environmental control unit would have operated if said attribute were maintained substantially at said predetermined set point, for storing said actual running time and projected running time in said memory, for determining a difference between said actual running time and said projected running time, and for outputting to said output device information representing said difference.

27. The apparatus of claim 26, wherein said program further includes instructions for determining a ratio of said difference to said projected running time, and for outputting said ratio to said output device.

28. The apparatus of claim 1, wherein said program further includes instructions for limiting the attribute set point to a predetermined absolute maximum.

29. The apparatus of claim 1, wherein said program further includes instructions for limiting the attribute set point to a predetermined absolute minimum.

30. A method for controlling levels of an environmental attribute of a room, the method being executed by a program having instructions stored in the memory of a computer controlling the operation of an environmental control unit for affecting said levels of said attribute, the method including the steps of:
(1) storing a set point representing a predetermined level of said attribute in said memory, a predetermined margin around said predetermined level, a maximum allowed drift deviation for when the room is unoccupied, a minimal drift deviation, and a maximum allowed recovery time to recover to said minimal drift deviation;
(2) determining whether said room is occupied;
(3) determining a current level of said attribute in said room;
(4) determining whether said current level is within said margin of said predetermined level; and if not, then proceeding to step 5, but if so, then stopping the operation of the environmental control unit if it is operating, and proceeding to step 2;
(5) if the determination of step 2 is positive, then proceeding to step 6, and otherwise proceeding to step 7;
(6) operating said environmental control unit to drive said current level towards said predetermined level, and then proceeding to step 2;
(7) setting a dynamic deviation of said attribute from said predetermined level to be the smaller of said maximum allowed drift deviation and a new allowed drift deviation for which the time to recover to said minimal drift deviation by operating said environmental control unit is no greater than said maximum allowed recovery time;
(8) determining whether said current level is within said dynamic deviation of said predetermined level of said attribute, and if not, then:
(8A) proceeding to step 6; but if so, then:
(8B) stopping the operation of the environmental control unit if it is operating and then proceeding to step 2; for allowing said current level to drift further from said predetermined level when said room is unoccupied but enabling recovery to said predetermined level within said maximum recovery time.

31. The method of claim 30, including storing said current level correlated with a time at which the current level was determined.

32. The method of claim 30, including, if the determination in step 8 is positive, after step 8 but before step 8A, the additional steps of:
(9) calculating a ratio of:
(i) a drift time from said current level to said dynamic deviation from said predetermined level, to
(ii) a recovery time from said current level to said dynamic deviation from said predetermined level; and
(1 ) determining whether said ratio is greater than a predetermined ratio, and if not, then proceeding to step 8A and if so, then proceeding to step 8B.

33. The method of claim 32, wherein the calculation of step 9 is carried out based upon empirically determined data for said room.

34. The method of claim 30, wherein said attribute is temperature, and step 6 comprises the step of operating at least one of a heating unit, a cooling unit, and a ventilating unit.

35. The method of claim 30, wherein said attribute is humidity, and step 6 comprises the step of operating at least one of a humidifier and a dehumidifier.

36. The method of claim 30, wherein said attribute is presence of a predetermined gas, and step 6 comprises the step of operating at least one of a ventilating unit and a degasification unit.

37. The method of claim 30, wherein said attribute is air flow, and step 6 comprises the step of operating a ventilating unit.

38. The method of claim 30, wherein step 1 further includes storing a first drift relationship and a first drive relationship representing response of levels of said attribute in said room to operating and not operating, respectively, said environmental control unit.

39. The method of claim 38, wherein:
step 1 further includes storing a second drive relationship, determined at a later time than said first drive relationship; and
the method further includes determining whether said second drive relationship deviates greater than a predetermined amount from said first drive relationship, and if so, then generating a signal representing said deviation.

40. The method of claim 30, further including the steps of:
determining whether, after a predetermined period of time of commencement of operation of said environmental control unit, a direction of change of said current level of said attribute in the room has changed, and if not, then ceasing operation of the environmental control unit.

41. The method of claim 30, further including the steps of:
determining whether, after a predetermined period of time of commencement of operation of said environmental control unit, said current level is within a predetermined amount of said set point, and if not, then ceasing operation of the environmental control unit.

42. The method of claim 30, including determining an expected delay time of actual, long-term nonoccupancy of the room at a time after an occupancy status of said room changes from occupied to unoccupied.

43. The method of claim 42, wherein step 7 includes overriding said maximum allowed recovery time to allow a larger said dynamic deviation when said expected delay time is greater than a predetermined length.

44. The method of claim 30, including, after step 8B, preventing the commencement of operation of the environmental control unit for a predetermined minimum off time.

45. The method of claim 30, wherein step 6 includes the step of operating said environmental control unit at one of a plurality of power settings.

46. The method of claim 45, wherein step 6 further includes the steps of:
determining one said power setting requiring the lowest energy consumption to maintain the current level of said attribute substantially at said set point; and
operating said environmental control unit at said one power setting.

47. The method of claim 30, wherein said set point is within a preprogrammed maximum range of levels of said attribute.

* * * * *

UNITED STATES PATENT AND TRADEMARK OFFICE
CERTIFICATE OF CORRECTION

PATENT NO. : 5,395,042           Page 1 of 2
DATED      : Mar. 7, 1995
INVENTOR(S): Joseph D. Riley and Marc H. Popek It is certified that error appears in the above-indentified patent and that said Letters Patent is hereby corrected as shown below:

Column 6, line 30, delete "Tau's $(= 1-(1/e)n)$" and insert therefor --Tau's $(= 1-(1/e)^n)$--.

Column 8, line 26, delete "and the margin." and insert therefor --and the margin--.

Column 8, line 50 of the patent, should not be indented.

Column 12, line 37, delete "$T_{newdrive} = C_{newdrive} + A_{drive}{}^* e-t/Bdrive$" and insert therefor --$T_{newdrive} = C_{newdrive} + A_{drive}{}^* e^{-t/Bdrive}$--.

Column 18, line 57, delete "manager's station-and," and insert therefor --manager's station and,--.

Column 20, line 45, delete "75.61   $t_1$" and insert therefor --75.61 → $t_1$--.

Column 20, line 46, delete "76.61   $-t_2$" and insert therefor --76.61 → $-t_2$--.

Column 20, line 48, delete "76.61   $t_1$" and insert therefor --76.61 → $t_1$--.

Column 20, line 49, delete "75.61   $-t_2$" and insert therefor --75.61 → $-t_2$--.

UNITED STATES PATENT AND TRADEMARK OFFICE
CERTIFICATE OF CORRECTION

PATENT NO. : 5,395,042
DATED : Mar. 7, 1995
INVENTOR(S) : Joseph D. Riley and Marc H. Popek It is certified that error appears in the above-indentified patent and that said Letters Patent is hereby corrected as shown below:

Column 32, line 51, Claim 32, delete "(1 )" and insert therefor --(10)--.

Signed and Sealed this

Sixth Day of June, 1995

Attest:

BRUCE LEHMAN

Attesting Officer

Commissioner of Patents and Trademarks